(12) United States Patent
Koyama

(10) Patent No.: US 9,703,380 B2
(45) Date of Patent: Jul. 11, 2017

(54) VEHICLE OPERATION INPUT DEVICE

(71) Applicant: HONDA MOTOR CO., LTD., Tokyo (JP)

(72) Inventor: Keiichiro Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 14/742,980

(22) Filed: Jun. 18, 2015

(65) Prior Publication Data

US 2015/0370329 A1 Dec. 24, 2015

(30) Foreign Application Priority Data

Jun. 19, 2014 (JP) .................................. 2014-126469

(51) Int. Cl.
*G06F 3/041* (2006.01)
*G06F 3/01* (2006.01)
(Continued)

(52) U.S. Cl.
CPC .............. *G06F 3/016* (2013.01); *B60K 35/00* (2013.01); *G06F 3/03549* (2013.01); *G06F 3/0488* (2013.01); *G06F 3/04842* (2013.01); *B60K 2350/1012* (2013.01); *B60K 2350/1028* (2013.01); *G06F 2203/014* (2013.01); *G06F 2203/04808* (2013.01)

(58) Field of Classification Search
CPC .... G06F 3/0169; G06F 3/017; G06F 3/03549; G06F 3/0414; G06F 3/0481; G06F 3/0484; G06F 3/04842; G06F 3/0488; G06F 2203/014; G06F 2203/04105; G06F 2203/04808; B60K 2350/1012; B60K 2350/102; B60K 2350/1028; B60K 2350/1052; B60K 2350/2008
See application file for complete search history.

(56) References Cited

U.S. PATENT DOCUMENTS 6,407,733 B1 * 6/2002 Kawakami ............ G06F 3/0433
178/18.03
7,339,581 B2 3/2008 Katayose
(Continued)

FOREIGN PATENT DOCUMENTS

JP 2005-190290 A 7/2005
JP 2005-216110 A 8/2005

*Primary Examiner* — Joe H Cheng
(74) *Attorney, Agent, or Firm* — Westerman, Hattori, Daniels & Adrian, LLP

(57) ABSTRACT

A vehicle operation input device includes an option display unit that displays a plurality of options on a display, an operation input unit having an operation surface, where the operation input unit generates operating information indicating a position in the operation surface at which a finger of the operator touches the operation surface, a finger position detecting unit that detects a position of part of an arm of the operator and obtains the position as the positional information regarding the finger of the operator, and a control unit. The control unit sets a particular option among the plurality of options immediately beneath the finger in accordance with the positional information regarding the finger obtained by the finger position detecting unit. An example of the particular option is at least one of the options located in the middle.

20 Claims, 17 Drawing Sheets

(51) Int. Cl.
*G06F 3/0484* (2013.01)
*G06F 3/0488* (2013.01)
*G06F 3/0354* (2013.01)
*B60K 35/00* (2006.01)

(56) References Cited

U.S. PATENT DOCUMENTS

| | | | | |
|---|---|---|---|---|
| 8,639,414 | B2* | 1/2014 | Suzaki | B60K 35/00 345/157 |
| 9,256,779 | B2* | 2/2016 | Obata | G06K 9/00355 |
| 2005/0238202 | A1* | 10/2005 | Sato | G06K 9/00832 382/104 |
| 2006/0214450 | A1* | 9/2006 | Sakakibara | B60K 37/06 296/37.8 |
| 2007/0230929 | A1* | 10/2007 | Niwa | G06K 9/00375 396/15 |
| 2009/0002342 | A1* | 1/2009 | Terada | G06F 3/011 345/175 |
| 2009/0195659 | A1* | 8/2009 | Nagata | G06F 3/03547 348/207.1 |
| 2015/0015521 | A1* | 1/2015 | Okohira | B60K 37/06 345/173 |

* cited by examiner

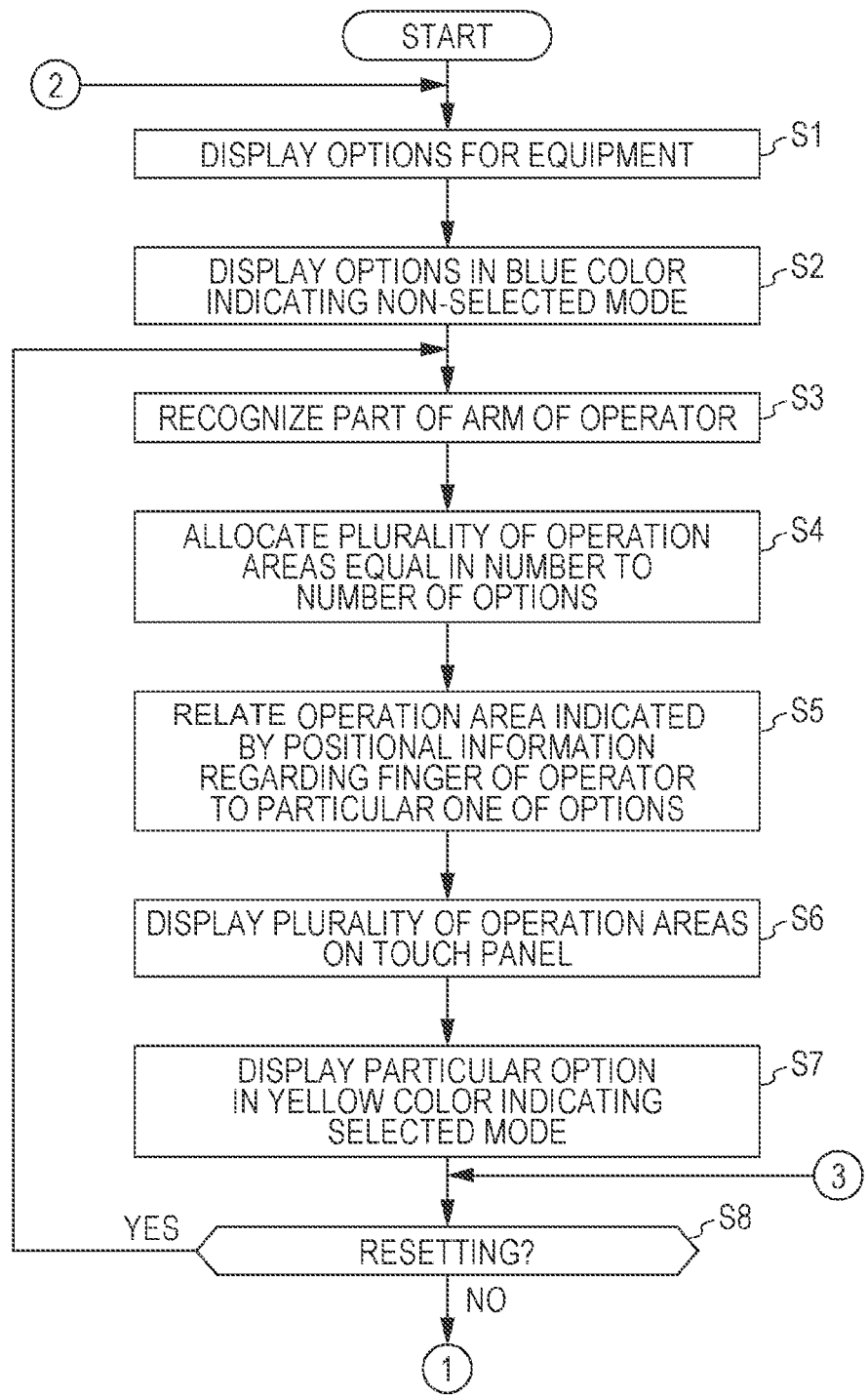

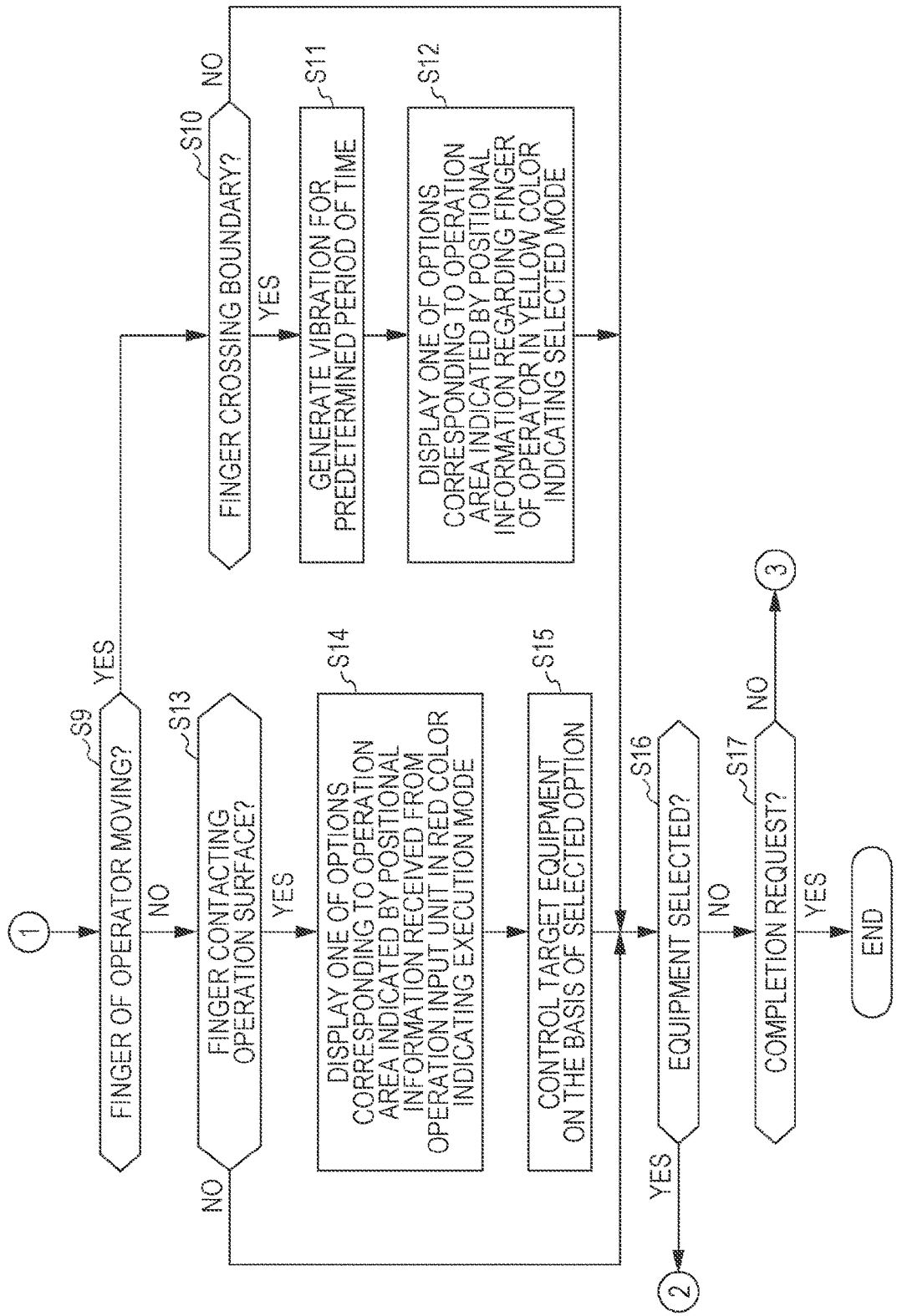

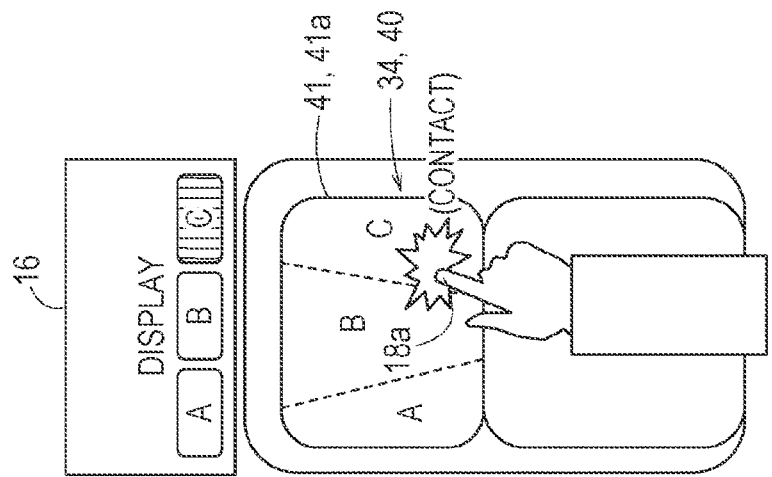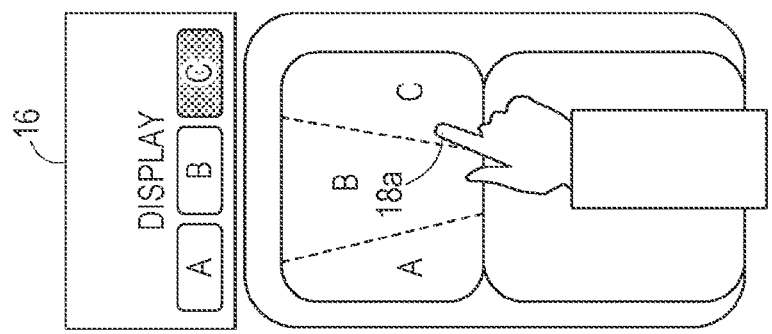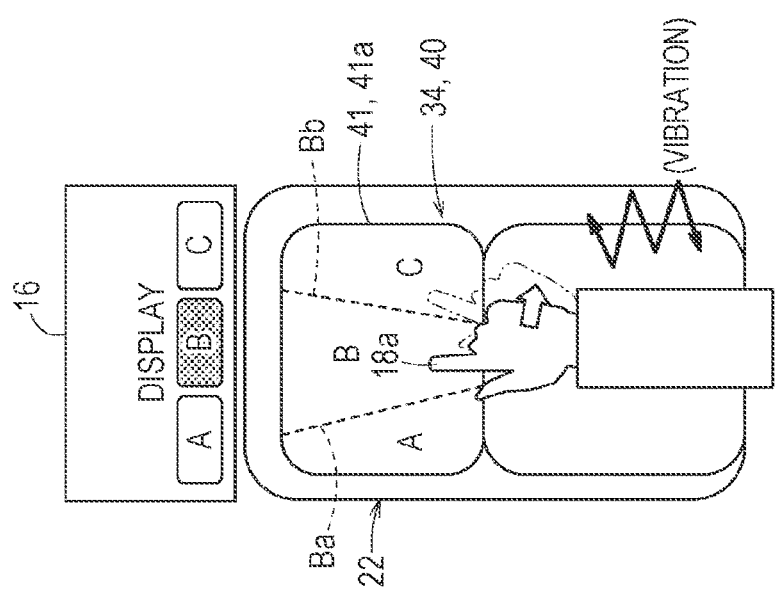

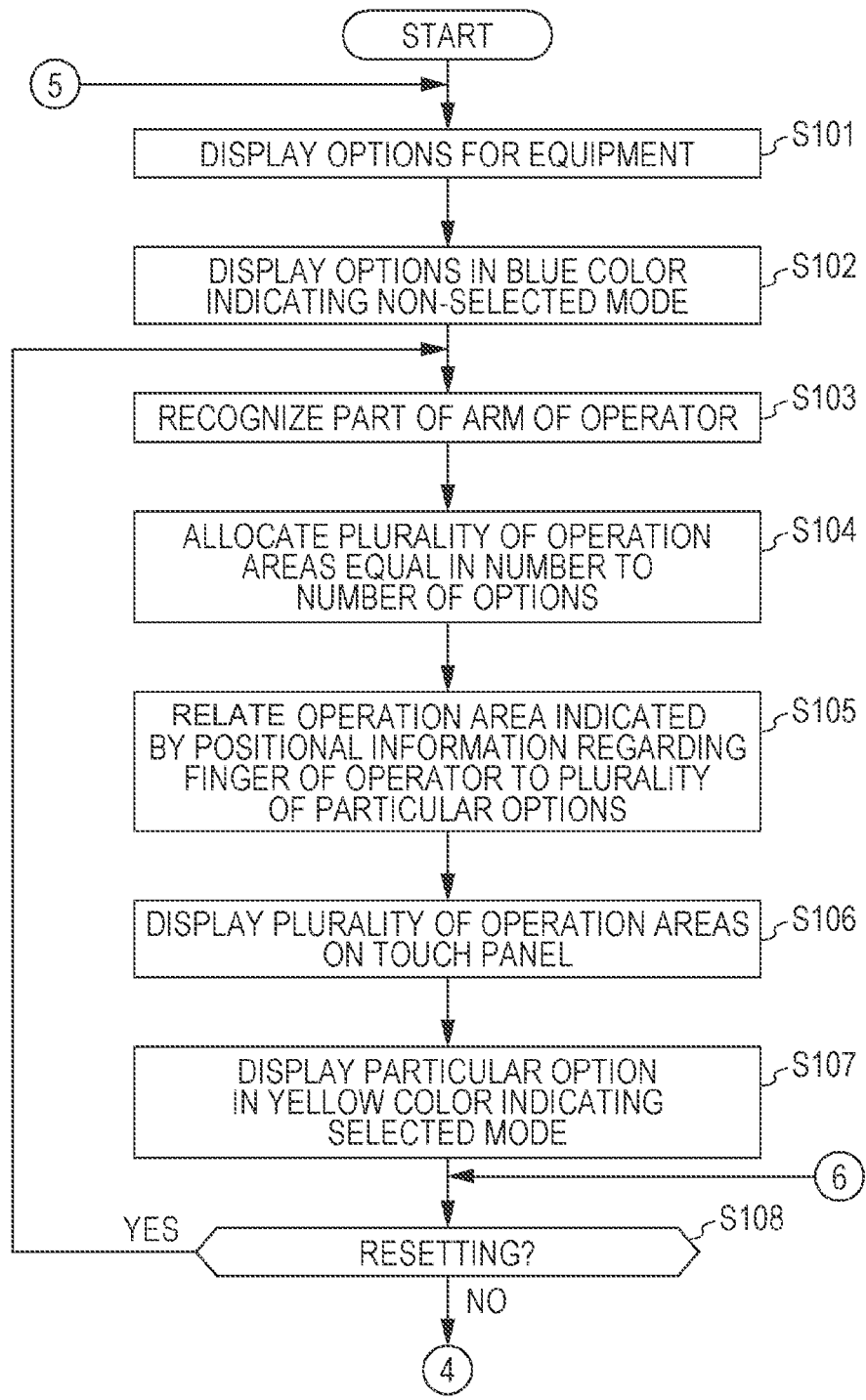

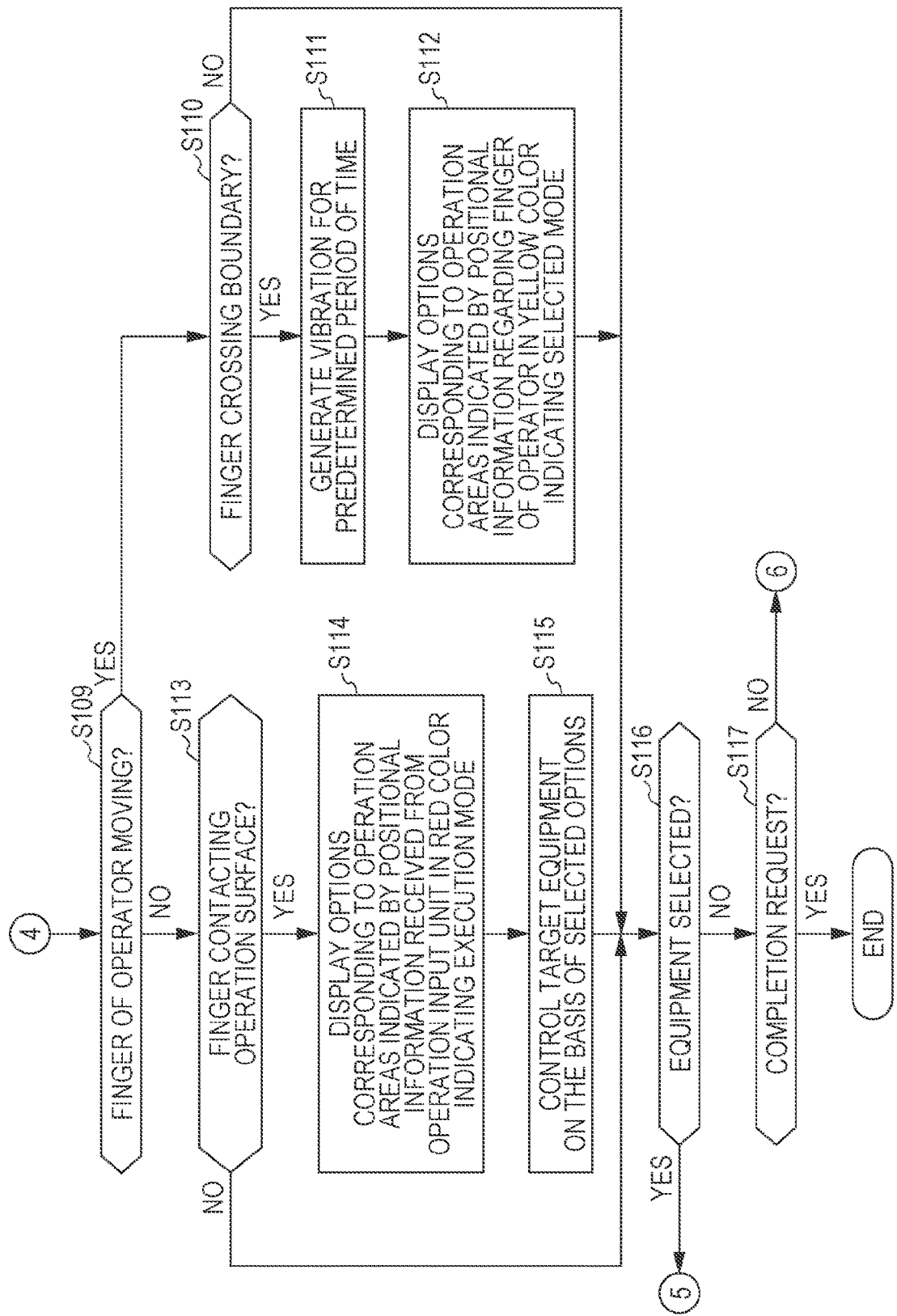

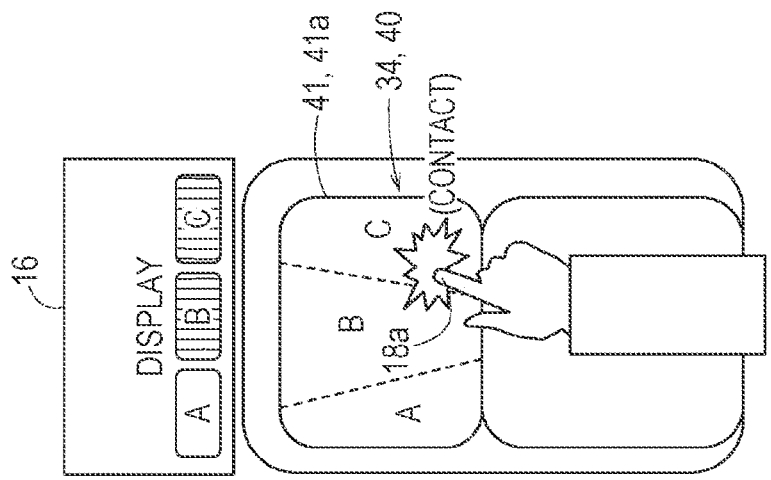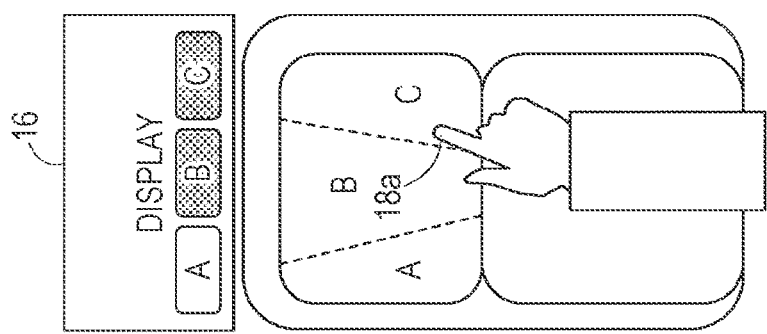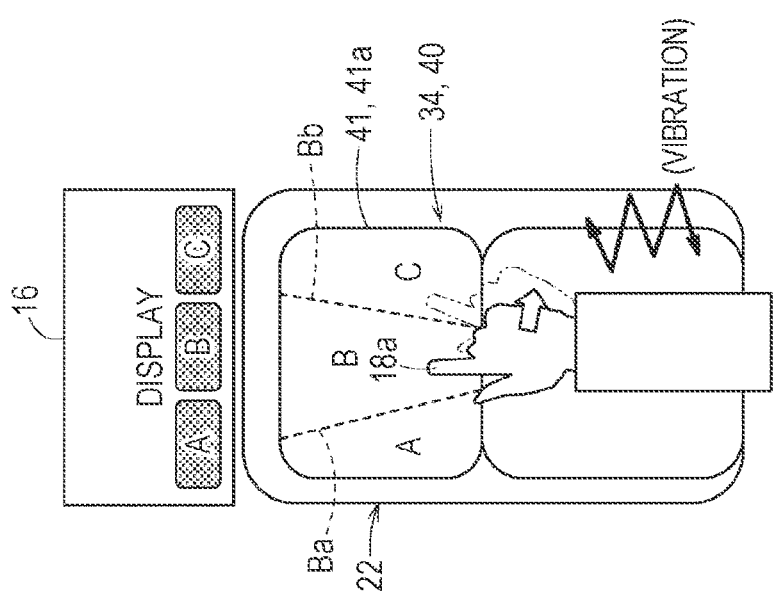

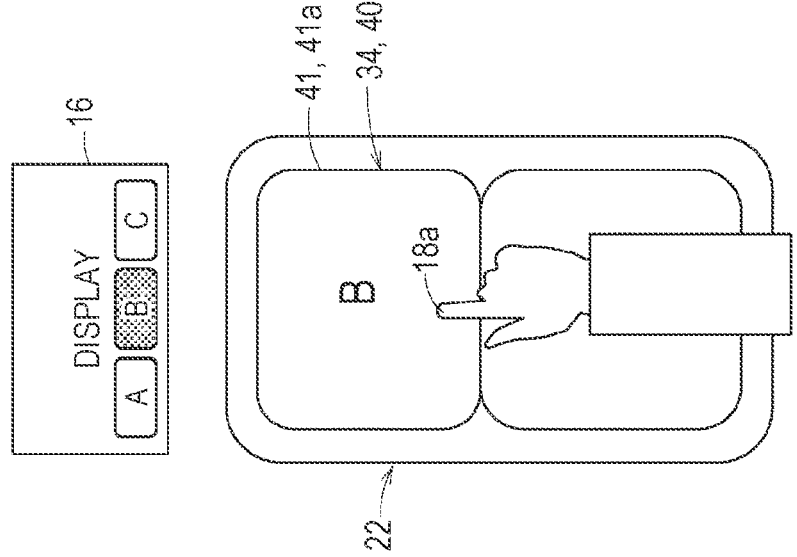
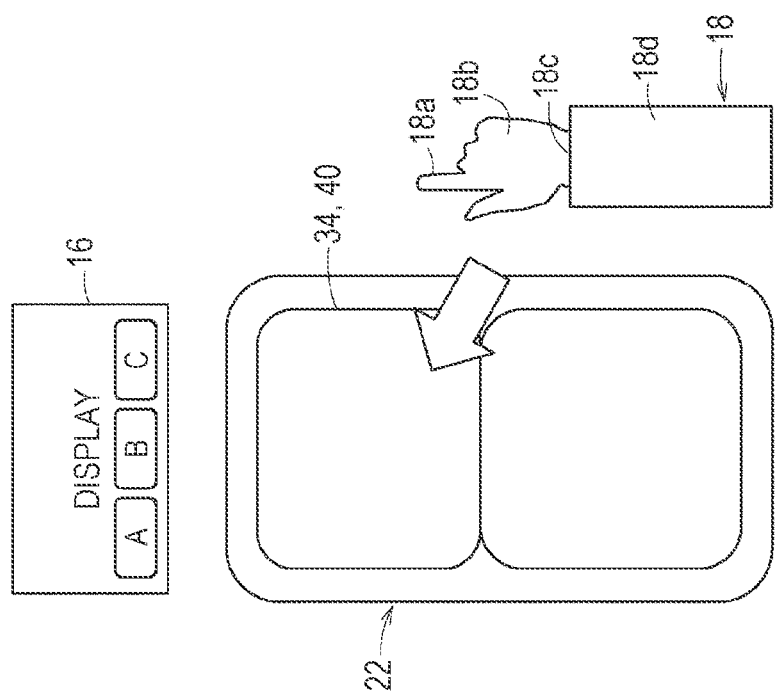

VEHICLE OPERATION INPUT DEVICE

CROSS REFERENCES TO RELATED APPLICATIONS

The present application claims priority under 35 U.S.C. §119 to Japanese Patent Application No. 2014-126469, filed Jun. 19, 2014, entitled "Vehicle Operation Input Device." The contents of this application are incorporated herein by reference in their entirety.

TECHNICAL FIELD

The present disclosure relates to a vehicle operation input device including a touch panel that detects a finger of an operator contacting the surface and allowing the operator to operate electrical equipment and electronic equipment mounted in a vehicle.

BACKGROUND

One of information operating devices used to operate electronic equipment and electrical equipment mounted in a vehicle is described in Japanese Unexamined Patent Application Publication No. 2005-216110.

The information operating device includes a haptic feedback arrays on an input operating unit used for selecting one of options displayed in a screen of a display unit. The haptic feedback arrays are disposed at intervals that are suitable for the sensitivity of a human finger. By electrically driving and controlling the haptic feedback arrays, haptic stimulations, such as surface irregularities arranged in lines, are enabled to the operator. By touching a position corresponding to a selected option displayed on the screen, the operator can select one of the processing functions. That is, Japanese Unexamined Patent Application Publication No. 2005-216110 describes a technique to change a detection range of the haptic feedback array in accordance with the information displayed on the screen in a vehicle.

SUMMARY

The technique described in Japanese Unexamined Patent Application Publication No. 2005-216110 has some issues to be addressed. That is, the operator needs to adapt to the detection range of the haptic feedback array. In addition, to operate the haptic feedback array, the eyesight needs to be directed toward the haptic feedback array and, thus, an eyes-off-road time is generated.

Accordingly, embodiments of the present application provide a vehicle operation input device that can provide the following advantages:
(a) The operator can set an operation area of an operation input unit, such as a touch panel, without adapting to the operation input unit.
(b) The operator need not check the positional relationship between the operation input unit and the finger every time the operator operates the operation input unit.
(c) Eyes-off-road time of the operator can be reduced while the operator is driving.
(d) The user friendliness can be increased, and the operability of the equipment can be increased.

(1) According to an aspect of the present disclosure, a vehicle operation input device capable of operating equipment includes an option display unit that displays, on a display, a plurality of options to be selected by an operator, where the options relates to types of processing performed by the equipment, an operation input unit having an operation surface, where the operation input unit generates operating information indicating a position in the operation surface at which a finger of the operator touches the operation surface, a finger position detecting unit that detects a position of part of an arm of the operator and obtains the position as the positional information regarding the finger of the operator, and a control unit that controls at least the option display unit and the equipment in accordance with the operating information generated by the operation input unit. The control unit sets a particular option among the plurality of options immediately beneath the finger in accordance with the positional information regarding the finger obtained by the finger position detecting unit.

If the distance between the arm of the operator and the operation input unit is less than or equal to a predetermined threshold value, that is, if part of the arm of the operator is recognized by the finger position detecting unit, the positional information regarding the finger obtained by the finger position detecting unit corresponds to the particular option. Thus, the particular option is set in accordance with the operation performed by the operator without the need for the operator to adapt to the operation input unit. Accordingly, the operator can select one of the options without moving their sight to the operation surface of the operation input unit. That is, the occurrence of a situation in which the operator moves their eyes from the front window is reduced. Thus, the ease of operation performed by the operator can be increased.

(2) The control unit may relate the positional information regarding the finger obtained by the finger position detecting unit to at least one of the options located in the middle among the plurality of options.

In particular, when the operator operates the operation input unit, the operator unintentionally places the finger at substantially the same position, in general. That is, the operator habitually places the finger at the position, and the finger is frequently placed at the position. By relating the option located in the middle to such a position, the operator can easily select the option located in the middle without moving their sight to the operation input unit. In addition, by moving the finger to the right or left from the above-described position, the operator can easily select the option located on the right or left side.

(3) The control unit may relate the positional information regarding the finger obtained by the finger position detecting unit to one of the options that is most frequently used by the operator among the plurality of options.

When the operator operates the operation input unit, the operator unintentionally places the finger at substantially the same position, in general. That is, the operator habitually places the finger at the position without moving their eyes to that position, and the finger is frequently placed at the position. By relating the option that the operator most frequently uses to such a position, the operator can easily select the most frequently used option without moving their sight to the operation input unit. In addition, since the operator need not frequently move their finger to the right and the left, the operation is facilitated.

(4) The control unit may relate the positional information regarding the finger obtained by the finger position detecting unit to two or more options including the option located in the middle among the plurality of options.

Some equipment executes a particular function if a plurality of options are simultaneously operated. In such a case, in general, "multi-touch" in which two or more fingers touch different operation areas at the same time is required. To perform multi-touch, the operator needs to move their sight to the operation surface of the operation input unit. In addition, since it is difficult for the operator to intuitively recognize which finger is used to operate the operation input unit, a certain period of time is required until a particular function is performed. However, by relating the positional information regarding the finger obtained by the finger position detecting unit to two or more options including the option located in the middle among the plurality of options, the need for multi-touch is eliminated. In addition, since the operation input unit can be operated by only one finger (e.g., an index finger), the operator can easily execute a particular function without moving their sight to the operation surface of the operation input unit. As a result, the occurrence of a situation in which the operator moves their eyes from the front window is reduced. Thus, the ease of operation performed by the operator can be increased.

(5) The vehicle operation input device may further include an armrest that allows the operator to put an arm of the operator thereon. The finger position detecting unit may include a pressure detecting unit disposed on the armrest, and the pressure detecting unit may detect a pressure of the arm against the armrest when the operator puts the arm on the armrest. The finger position detecting unit may obtain the positional information regarding the finger using a pressure distribution of the arm detected by the pressure detecting unit.

By using the pressure distribution received from the pressure detecting unit disposed in the armrest that allows an arm of the operator to be placed thereon, the positional information regarding the finger of the operator can be easily obtained. As a result, the operator can select one of the options using the operation input unit without moving their sight to the operation surface of the operation input unit. As a result, the occurrence of a situation in which the operator moves their eyes from the front window is reduced. Thus, the ease of operation performed by the operator can be increased.

(6) The vehicle operation input device may further include an armrest that allows the operator to put an arm of the operator thereon. The finger position detecting unit may include a trackball disposed on the armrest, and the finger position detecting unit may detect movement of the arm when the operator puts the arm on the armrest. The finger position detecting unit may obtain the positional information regarding the finger using a rotation direction and an amount of rotation of the trackball.

The positional information regarding the finger of the operator can be easily obtained on the basis of the rotation direction and the amount of rotation of the trackball. As a result, the operator can select one of the options using the operation input unit without moving their sight to the operation surface of the operation input unit. As a result, the occurrence of a situation in which the operator moves their eyes from the front window is reduced. Thus, the ease of operation performed by the operator can be increased.

(7) The vehicle operation input device may further includes a feedback unit that feeds back, to the operator, information indicating that the finger of the operator has moved from a current operation area to another operation area. The control unit may control the feedback unit on the basis of layout information regarding the plurality of operation areas corresponding to the plurality of options and the positional information regarding the finger received from the finger position detecting unit.

In this manner, upon receiving feedback, the operator can be easily aware that the finger has moved from one of the operation areas to another operation area. Thus, to change the option, the operator need not move their sight to the operation surface of the operation input unit.

(8) In such a case, the feedback unit may include a vibration feedback unit that feeds back the information to the operator using vibration, and the control unit may control the vibration feedback unit to generate the vibration when the finger of the operator is moved from the current operation area to another operation area of the operation surface.

To feed back the information to the operator, a technique using vibration, a technique using light emission, or a technique using sound can be employed. In the case of the technique using sound, the sound may be canceled out by other sound (e.g., music or speech). In the case of the technique using light emission, the vision of the operator may be temporarily disturbed due to the light. However, in the case of the technique using vibration, such problems do not arise. The vibration is directly transferred to the operator. Thus, the ease of operation performed by the operator increases.

(9) The control unit may control the option display unit to display, among the plurality of options, an option corresponding to the operation area located at a position indicated by the positional information regarding the finger obtained by the finger position detecting unit in a color indicating a selected mode, display an option corresponding to the operation area that the finger of the operator touches in another color indicating an execution mode, and display the other options in another color indicating a non-selected mode.

By glancing at the display and recognizing the color of the option on the display, the operator can be easily aware which option is currently selected or executed without moving their sight to the operation surface of the operation input unit.

According to embodiments of the present disclosure, the following advantages can be provided:

(a) The operator can set an operation area of an operation input unit, such as a touch panel, that is suitable for the operator without adapting to the operation input unit.

(b) The operator need not check the positional relationship between the operation input unit and the finger every time the operator operates the operation input unit.

(c) Eyes-off-road time of the operator can be reduced while the operator is driving.

(d) The user friendliness can be increased, and the operability of equipment can be increased.

BRIEF DESCRIPTION OF THE DRAWINGS

FIG. 8 is a first flowchart illustrating a first processing operation performed by the vehicle operation input device according to the exemplary embodiment.

FIG. 9 is a second flowchart illustrating the first processing operation performed by the vehicle operation input device according to the exemplary embodiment.

FIG. 10A illustrates the case where in the first processing operation, the finger located above the operation area in the middle to select the option in the middle is moved to the right; FIG. 10B illustrates the case where the finger is moved to the operation area on the right side; and FIG. 10C illustrates the case where the finger touches the operation area on the right side to execute the option on the right side.

FIG. 11 is a first flowchart illustrating a second processing operation performed by the vehicle operation input device according to the exemplary embodiment.

FIG. 12 is a second flowchart illustrating the second processing operation performed by the vehicle operation input device according to the exemplary embodiment.

FIG. 13A illustrates the case where in the second processing operation, the finger placed above the operation area in the middle to select three options is moved to the operation area on the right side; FIG. 13B illustrates the case where the finger moved to the operation area on the right side is selecting the option in the middle and the option on the right side at the same time; and FIG. 13C illustrates the case where the finger touches the operation area on the right side to execute the option in the middle and the option on the right side at the same time.

FIG. 16A illustrates part of the arm of the operator moving toward the operation input unit (the touch panel) in the third processing operation; and FIG. 16B illustrates an example of an image of the operation area displayed on a display panel when the finger is placed in the substantially middle of the operation surface in the lateral direction.

DESCRIPTION OF THE PREFERRED EMBODIMENTS

A vehicle operation input device according to an exemplary embodiment of the present disclosure is described below with reference to the accompanying drawings, FIGS. 1 to 17C.

Figure 1:
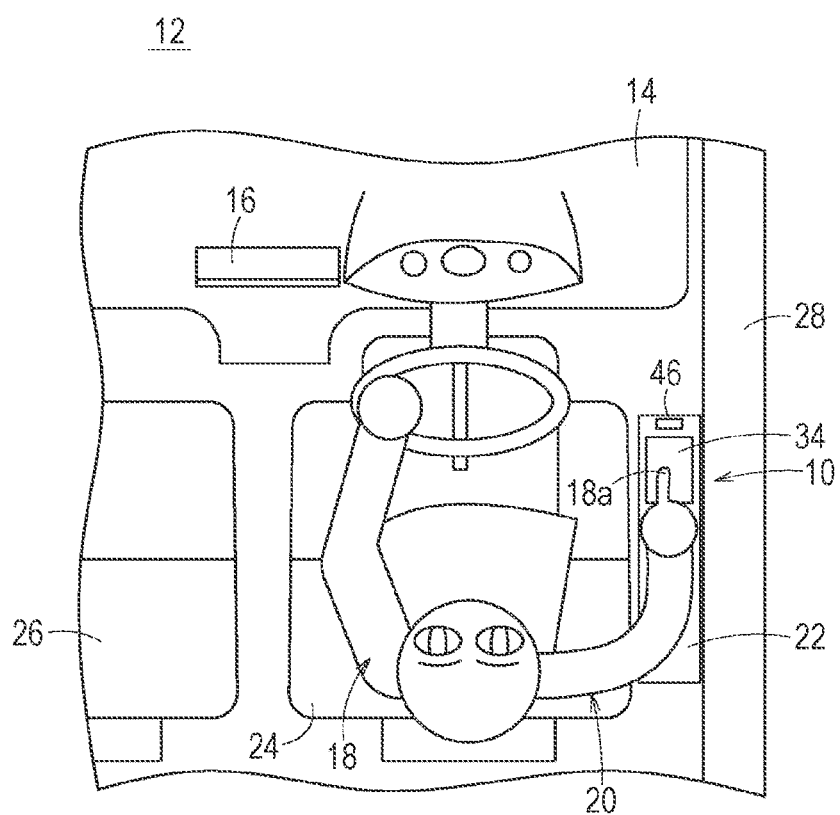
FIG. 1 is a schematic plan view from the above of part of a front seat of a vehicle having a vehicle operation input device mounted therein according to an exemplary embodiment.

As illustrated in FIG. 1, a vehicle 12 has a vehicle operation input device according to the present exemplary embodiment mounted therein (hereinafter, the vehicle operation input device is simply referred to as an "operation input device 10"). The vehicle 12 includes a display 16 provided in an instrumental panel 14 and an armrest 22 that allows an operator 18 (an occupant) to place an arm 20 of the operator 18 thereon. The armrest 22 is disposed between a driver's seat 24 and a front passenger seat 26 or is disposed on the inboard side of a door 28. In an example illustrated in FIG. 1, the armrest 22 is disposed on the inboard side of the door 28 adjacent to the driver's seat 24.

The electrical equipment and electronic equipment (hereinafter simply referred to as "equipment 30", refer to FIG. 2) can be operated by using the operation input device 10. Examples of the electrical equipment include an air conditioner and a power window unit of the vehicle 12. Examples of the electronic equipment include a navigation device that presents a route with a map and a display audio device that can operate in cooperation with a mobile information terminal, such as a cell phone or a smartphone.

Figure 2:
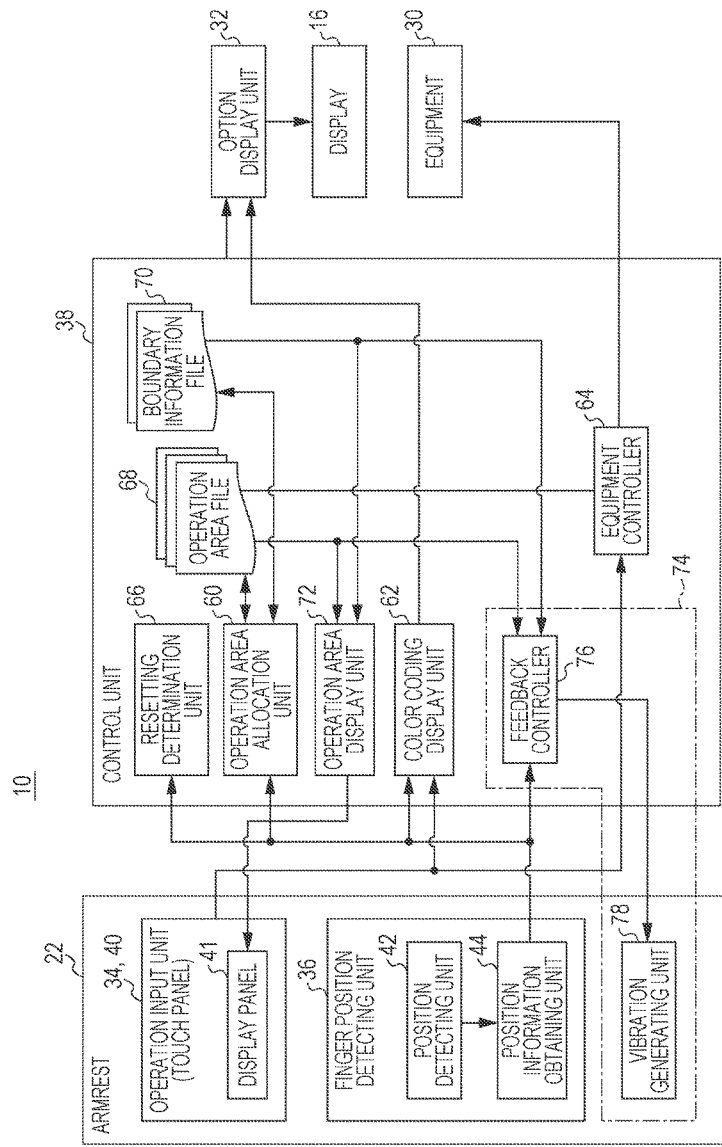
FIG. 2 is a schematic block diagram of the configuration of the vehicle operation input device.

As illustrated in FIG. 2, the operation input device 10 includes an option display unit 32, an operation input unit 34, a finger position detecting unit 36, and a control unit 38 that controls at least the option display unit 32 and the equipment 30. At least the option display unit 32 and the control unit 38 may be configured in the form of hardware, such as an electronic circuit, or software (a program serving as an instruction set stored in a storage unit and executed by a central processing unit (CPU)).

Figure 3:
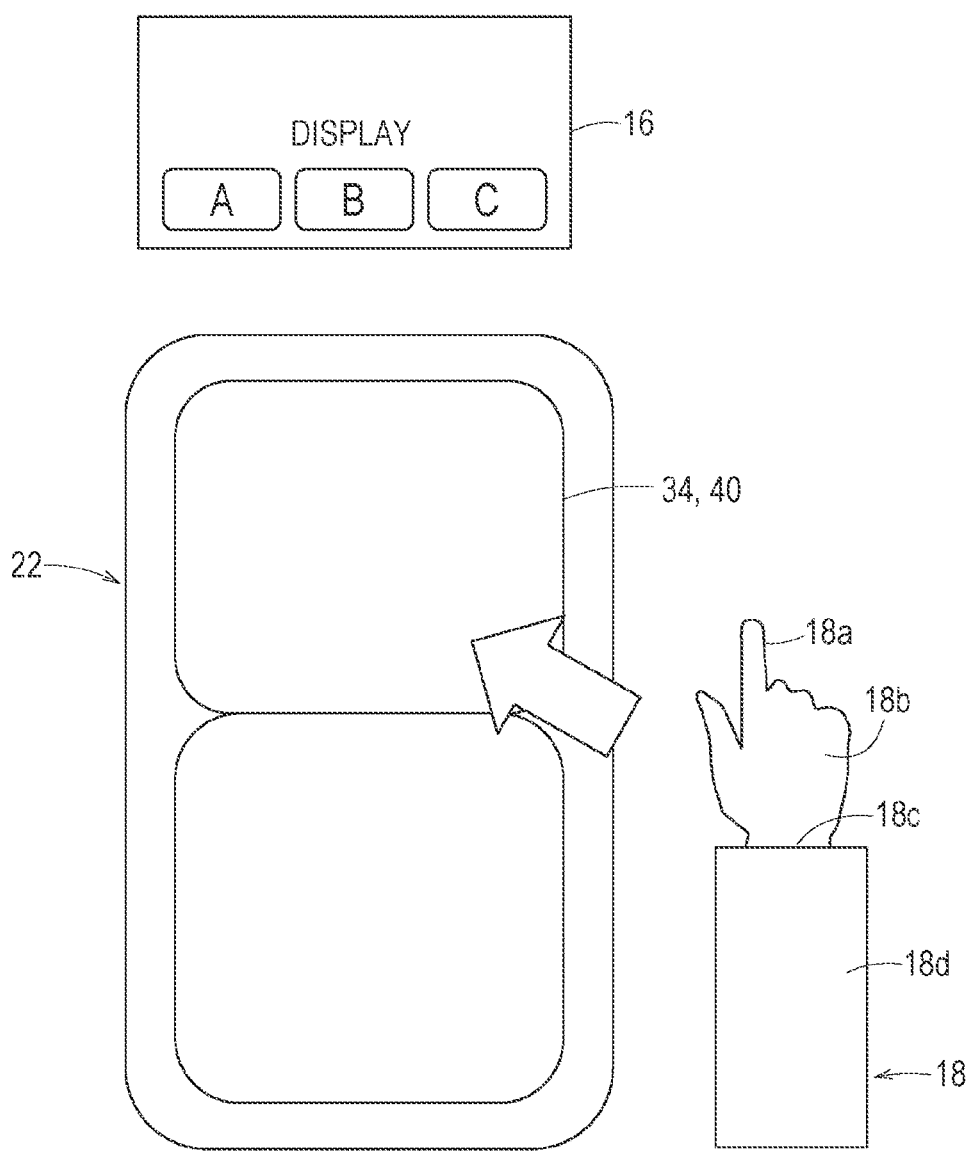
FIG. 3 illustrates part of the arm of an operator moving toward an operation input unit (a touch panel) mounted on an armrest and a display format of options on a display.

The option display unit 32 displays, on the display 16, a plurality of options of the processing performed by the equipment 30 under the control of the control unit 38, so that the operator 18 can select one of the options. For example, as illustrated in FIG. 3, the options include an option A, an option B, and an option C displayed on the display 16. The operator 18 selects the type of operation performed by the equipment 30. Then, the control unit 38 reads the information regarding the selected type of operation performed by the equipment 30 that is required for operating the equipment 30 and provides the information to the option display unit 32. Examples of the information regarding the option include the index data and address data used to read out the image data of the option stored in the storage unit, display position information indicating the position in the display 16 at which the image data is to be displayed, and the frequency of usage.

The option display unit 32 reads out the image data of an option corresponding to the option information supplied from the storage unit. Thereafter, the option display unit 32 renders the image data in an image memory at a position indicated by the display position information. In this manner, the image of the option loaded into the image memory is displayed on the display 16.

As illustrated in FIGS. 1 and 3, the operation input unit 34 is formed as, for example, a touch panel 40 disposed on the armrest 22. A touch panel having a transparent operation surface and disposed on a display panel 41 mounted on the armrest 22 may be used as the touch panel 40. Alternatively, a touch panel not having the display panel 41 and having an opaque operation surface may be used as the touch panel 40. For example, an electrostatic sensing electrode may be used as the operation surface. The operation input unit 34 generates information indicating a position in the operation surface at which a finger 18a of the operator 18 touches the operation film (i.e., operating information).

The finger position detecting unit 36 detects the position of a part of an arm of the operator 18 (e.g., the finger 18a, a palm 18b, a wrist 18c, or a lower arm 18d) (refer to FIG. 3) and obtains the position as the positional information about, for example, the finger 18a of the operator 18. More specifically, as illustrated in FIG. 2, the finger position detecting unit 36 includes a position detecting unit 42 that detects the position of a part of the arm of the operator 18 and a positional information obtaining unit 44 that obtains the positional information of the finger 18a of the operator 18 on the basis of a position detection signal output from the position detecting unit 42.

Figure 5A:
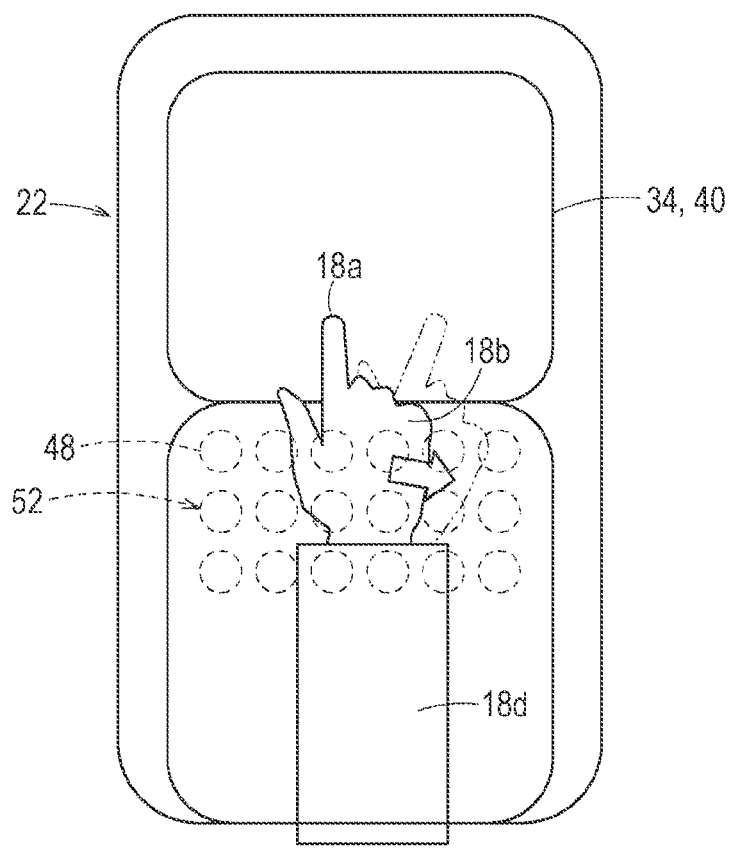
FIG. 5A illustrates an example of a flat pressure sensor formed from a plurality of pressure sensors and disposed in an armrest.
Figure 6A:
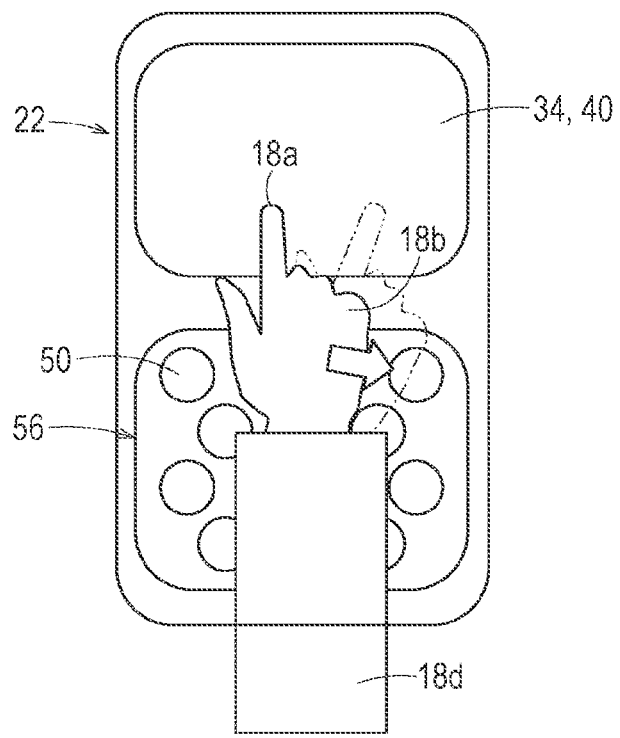
FIG. 6A illustrates an example of a flat trackball formed from a plurality of trackballs and disposed in an armrest.
Figure 6B:
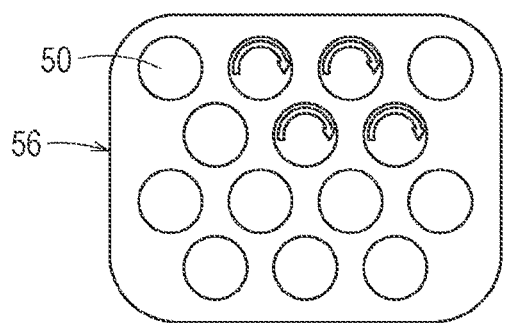
FIG. 6B illustrates some of the trackballs rotating when part of the arm of the operator moves.

Examples of the position detecting unit 42 include a camera 46 (refer to FIG. 1), a pressure sensor 48 (refer to FIG. 5A), and a trackball 50 (refer to FIGS. 6A and 6B). The camera 46 is mounted on, for example, the ceiling of the compartment or in the vicinity of the operation input unit 34. The pressure sensor 48 or the trackball 50 is mounted on the top surface of the armrest 22 (e.g., a portion of the armrest 22 with which the wrist 18c or the lower arm 18d of the operator 18 is brought into contact).

If the position detecting unit 42 is formed from the camera 46, it is desirable that the positional information obtaining unit 44 employs a technique to obtain the positional information regarding the finger 18a of the operator 18 from, for example, a motion vector between frames of captured image data sent from the camera 46 on a frame-to-frame basis. If the position detecting unit 42 is formed from the pressure sensor 48, it is desirable that the positional information obtaining unit 44 employs a technique to obtain the positional information regarding the finger 18a of the operator 18 on the basis of the pressure distribution output from the pressure sensor 48. However, if the position detecting unit 42 is formed from the trackball 50, it is desirable that the positional information obtaining unit 44 employs a technique to obtain the positional information regarding the finger 18a of the operator 18 on the basis of the rotational direction and the amount of rotation of the trackball 50.

The acquisition of the positional information by the positional information obtaining unit 44 is described below with reference to FIGS. 4 to 6B.

Figure 4:
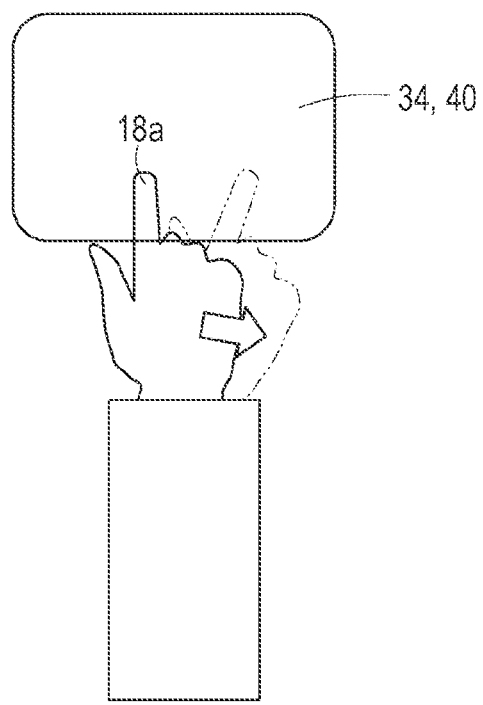
FIG. 4 illustrates the finger of an operator moving above an operation surface of the operation input unit (the touch panel).

If the position detecting unit 42 is formed from the camera 46, the camera 46 is set so that the operation surface of the touch panel 40 is within the line of sight of the camera 46. The line of sight of the camera 46 is fixed. Accordingly, an image captured by the camera 46 is, for example, the image of the operation surface of the touch panel 40 and the finger 18a of the operator 18 that moves above the operation surface. The position information obtaining unit 44 sequentially obtains the captured image data sent from the camera 46 on a frame-to-frame basis. Thereafter, by detecting a motion vector between the frames, only a moving image, that is, only the image of the finger 18a of the operator 18 is extracted. Thus, the coordinates of the position of the finger 18a is obtained. For example, as illustrated in FIG. 4, when the operator 18 is operating the touch panel 40 with the finger 18a (hereinafter also referred to as an "index finger 18a"), the image of the index finger 18a is extracted. Thereafter, the coordinates of the position of the tip of the index finger 18a is obtained. The coordinates of the position are represented by the horizontal coordinate (the x coordinate) and the vertical coordinate (the y coordinate) in an imaging memory.

Figure 5B:
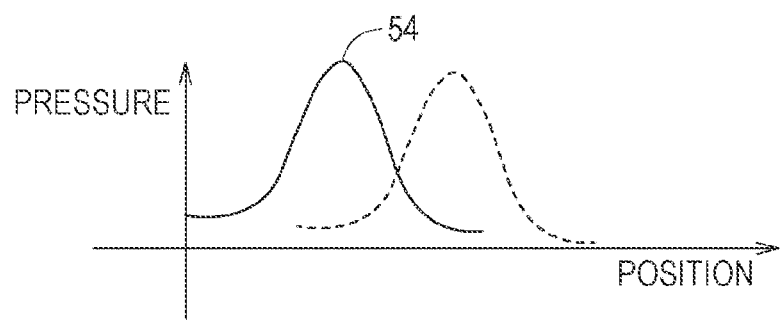
FIG. 5B is a graph indicating an example of pressure distribution obtained by the flat pressure sensor when part of the arm of the operator moves.

If the position detecting unit 42 is formed using the pressure sensor 48, a flat pressure sensor 52 having a plurality of the pressure sensors 48 arranged therein, for example, a matrix or a staggered arrangement can be used as the position detecting unit 42. In such a case, for example, as illustrated in FIG. 5A, the flat pressure sensor 52 is mounted on a portion of the armrest 22 with which part of the arm (part of the palm 18b) of the operator 18 is brought into contact. In this manner, as illustrated in FIG. 5B, the flat pressure sensor 52 outputs a distribution of pressures applied to different positions, that is, a pressure distribution 54. In addition, as the position of the finger 18a that operates the touch panel 40 moves, the part of the palm 18b also moves. Accordingly, the peak point of the pressure distribution 54 output from the flat pressure sensor 52 moves in accordance with the position of the finger 18a. Thus, the position information obtaining unit 44 acquires the pressure distribution 54 output from the flat pressure sensor 52 and obtains the coordinates of, for example, the position of the finger 18a on the basis of the obtained pressure distribution 54.

If the position detecting unit 42 is formed using the trackball 50, a flat trackball 56 having a plurality of the trackballs 50 arranged therein in, for example, a matrix or a staggered arrangement can be used as the position detecting unit 42, as illustrated in FIG. 6A. In such a case, the flat trackball 56 is mounted on a portion of the armrest 22 with which part of the arm (part of the palm 18b or part of the lower arm 18d) of the operator 18 is brought into contact. In this manner, as illustrated in FIG. 6B, as the position of the finger 18a that operates the touch panel 40 moves, the part of the palm 18b also moves. Accordingly, a plurality of the trackballs 50 located immediately under the part of the palm 18b rotate in accordance with the movement of the finger 18a. Thus, the position information obtaining unit 44 acquires the rotational direction and the amount of rotation of each of the trackballs 50 and can obtain, for example, how far the index finger 18a moves, that is, the positional information regarding the index finger 18a.

Note that the finger position detecting unit 36 may obtain the positional information regarding the finger 18a by combining at least two of the above-described three techniques using the camera 46, the flat pressure sensor 52, and the flat trackball 56.

As illustrated in FIG. 2, the control unit 38 includes an operation area allocation unit 60, a color coding display unit 62, an equipment control unit 64, and a resetting determination unit 66.

The operation area allocation unit 60 starts when the finger position detecting unit 36 recognizes part of the arm of the operator 18, that is, when the finger position detecting unit 36 obtains the positional information regarding the finger 18a of the operator 18. Thereafter, the operation area allocation unit 60 allocates a plurality of operation areas equal in number to the number of options on the basis of the obtained positional information regarding the finger 18a. In addition, among the allocated operation areas, the operation area allocation unit 60 relates the operation area corresponding to the positional information regarding the finger 18a obtained by the finger position detecting unit 36 to a particular option.

Figure 7C:
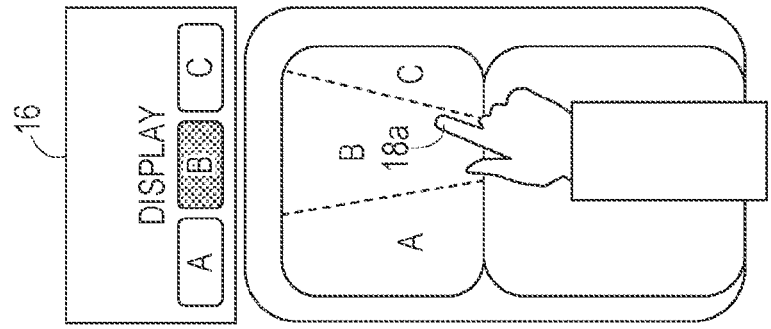
FIG. 7C illustrates an example of allocation of operation areas when the finger is placed on the right side of the substantially middle of the operation surface in the lateral direction.
Figure 7B:
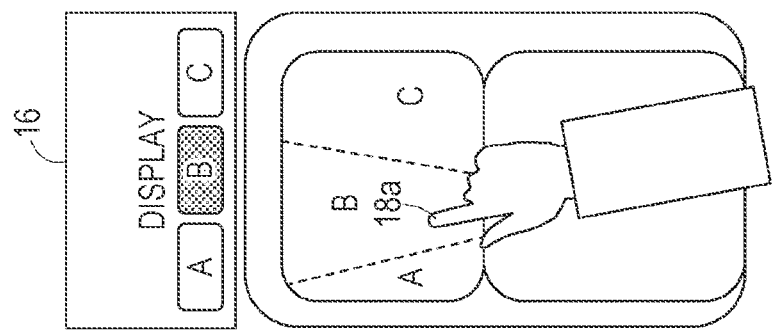
FIG. 7B illustrates an example of allocation of operation areas when the finger is placed on the left side of the substantially middle of the operation surface in the lateral direction.
Figure 7A:
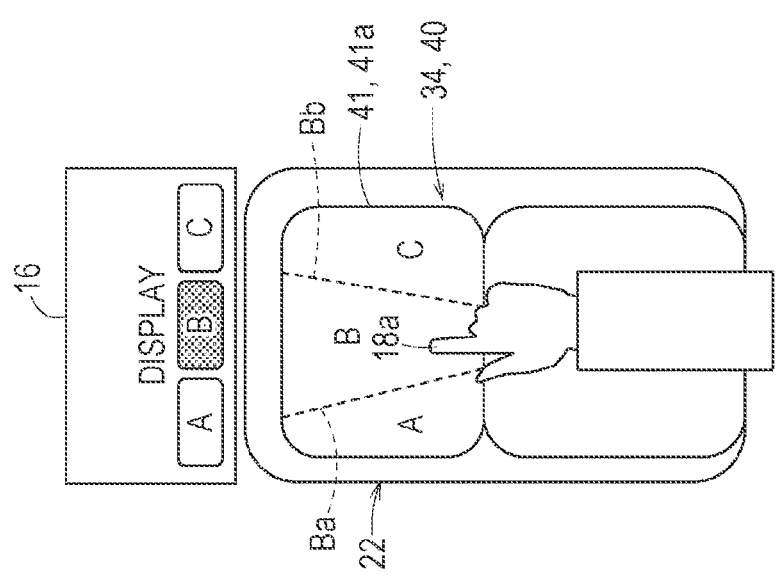
FIG. 7A illustrates an example of allocation of operation areas when the finger is placed in the substantially middle of the operation surface in the lateral direction.

For example, as illustrated in FIGS. 7A to 7C, when three options A, B, and C are displayed on the display 16, the operation area allocation unit 60 allocates, in the touch panel 40, three operation areas A, B, and C corresponding to the three options A, B, and C, respectively. At that time, the operation area allocation unit 60 allocates the operation area B in the middle in a portion of the operation surface of the touch panel 40 corresponding to the positional information regarding the finger 18a obtained by the finger position detecting unit 36. That is, the operation area allocation unit 60 allocates the operation area B in the portion of the operation surface immediately beneath the finger 18a.

For example, as illustrated in FIG. 7A, in the case where the option B is located in the middle of the option arrangement, the option A is located on the left side of the option B, and the option C is located on the right side of the option B, if the finger 18a is located in the substantially middle of the operation surface in the lateral direction, the operation area B is allocated in the middle portion of the operation surface. In addition, the operation area A is allocated in a portion on the left side of the middle portion, and the operation area C is allocated in a portion on the right side of the middle portion. In this case, the operation areas A, B, and C are arranged in a radial fashion about the wrist 18c of the operator 18 so as to cover the movable range of the wrist 18c of the operator 18. At that time, the operation area B is allocated so as to be located in the middle of the operation surface.

For example, as illustrated in FIG. 7B, when the finger 18a is located on the left side of the substantially middle of the operation surface in the lateral direction, the operation area B is allocated in a portion of the operation surface on the left side of the middle of the operation surface so as to be located at the position of the finger 18a. In addition, the operation area A is allocated in a portion on the left side of the operation area B, and the operation area C is allocated in a portion on the right side of the operation area B. That is, as compared with the layout in FIG. 7A, all the operation areas A, B, and C are shifted to the left.

Similarly, as illustrated in FIG. 7C, when the finger 18a is located on the right side of the substantially middle of the operation surface in the lateral direction, the operation area B is allocated in a portion of the operation surface on the right side of the middle of the operation surface so as to be located at the position of the finger 18a. In addition, the operation area A is allocated in a portion on the left side of the operation area B, and the operation area C is allocated in a portion on the right side of the operation area B. That is, as compared with the layout in FIG. 7A, all the operation areas A, B, and C are shifted to the right.

The layout of the operation areas A, B, and C is not physically determined in the operation input unit 34, but the layout range of each of the operation areas (the layout information) is stored in the storage unit of the control unit 38 as data. At that time, the positional information) of a boundary between adjacent operation areas is also stored as data. Examples of the boundary include, as illustrated in FIGS. 7A to 7C, a boundary Ba between the operation areas A and B and a boundary Bb between the operation areas B and C.

For example, as illustrated in FIG. 2, the operation area allocation unit 60 generates a plurality of operation area files 68 equal in number to the number of options. Thereafter, the operation area allocation unit 60 records the identification number of an option, the data indicating the operation area corresponding to the option, and control information for the equipment 30 corresponding to the option in one of the operation area files 68 corresponding to the option. That is, the operation area allocation unit 60 logically allocates a plurality of operation areas. If the equipment 30 is an audio device, examples of the control information for the equipment 30 include information used to perform replay, stop, and skip control on the equipment 30.

In addition, the operation area allocation unit 60 generates a plurality of boundary information files 70 equal in number to the number of the boundaries. Thereafter, the operation area allocation unit 60 records the data indicating the range of each of the boundaries in one of the boundary information files 70. In FIGS. 7A to 7C, the operation areas A, B, and C are logically allocated in the operation surface of the operation input unit 34 so as to correspond to the three options A, B, and C displayed on the display 16, respectively. In this case, the range of the boundary Ba between adjacent operation areas and the range of the boundary Bb between adjacent operation areas are also logically set.

In particular, as described above, among the plurality of allocated operation areas, the operation area allocation unit 60 relates od associates the operation area corresponding to the positional information regarding the finger 18a obtained by the finger position detecting unit 36 to a particular option among the plurality of options. That is, the operation area allocation unit 60 sets the particular option among the plurality of options at a position immediately beneath the finger 18a in accordance with the positional information regarding the finger 18a obtained by the finger position detecting unit 36. For example, the operation area allocation unit 60 registers the identification number of the particular option in the operation area file 68 for the operation area corresponding to the positional information regarding the finger 18a. For example, the operation area allocation unit 60 searches for the identification number of an option that is most frequently used on the basis of the above-described information regarding the option and registers the identification number. Alternatively, the operation area allocation unit 60 searches for the identification number of an option located in the middle on the basis of the option information and registers the identification number. When the finger 18a is moved to the operation area A on the left side or the operation area C on the right side in operating the touch panel 40, the finger 18a passes through the operation area B located between the operation areas A and C. Accordingly, it is reasonable and efficient in operating the touch panel 40 that the option that is most frequently used is allocated to the operation area B in the middle. Furthermore, if the options A, B, and C displayed on the display 16 are arranged along the lateral direction so as to correspond to the three operation areas A, B, and C, respectively, the operational direction to select an option can be made the same as the operational direction of the touch panel 40 by relating the option B in the middle to the operation area B in the middle. As a result, when selecting an option using the touch panel 40, the operator 18 can easily select the option without moving their sight to the touch panel 40.

The above description has been made with reference to the case of three options. In contrast, in the case of, for example, four options (options A, B, C, and D), the operation area B, the operation area C, or a pair consisting of the operation areas B and C is allocated at the position corresponding to the positional information regarding the finger 18a obtained by the finger position detecting unit 36. Thereafter, the operation area B is related to the option B, the operation area C is related to the option C, or the operation areas B and C are related to the option B and C, respectively.

Similarly, in the case of, for example, five options (options A, B, C, D, and E), the operation area C is allocated at the position corresponding to the positional information regarding the finger 18a obtained by the finger position detecting unit 36. Thereafter, the operation area C is related to the option C.

In this manner, by setting the particular option to the option that is most frequently used, the operator 18 can easily select the option that is most frequently used without moving their sight to the operation surface of the touch panel 40. Accordingly, the operator 18 need not frequently move their finger to the right and left. Thus, the operation performed by the operator 18 is facilitated. In addition, by setting the particular option to the option located in the middle among the plurality of options, the operator 18 can easily select the option in the middle without moving their sight to the operation surface of the touch panel 40. Furthermore, by moving the finger 18a to the right or left from the operation area in the middle serving as a reference position, the option on the right side and the option on the left side can be easily selected.

The color coding display unit 62 controls the option display unit 32 to display the options in different colors in the following manner. That is, among the plurality of options, the option corresponding to the operation area located at a position indicated by the positional information regarding the finger 18a obtained by the finger position detecting unit 36 is displayed in a color corresponding to a selected mode. The option corresponding to the operation area that the finger 18a of the operator 18 touches is displayed in a color corresponding to an execution mode. The other options are displayed in another color corresponding to a non-selected mode.

The equipment control unit 64 reads out the control information from the operation area file 68 corresponding to the operation area that the finger 18a of the operator 18 touches among the plurality of operation area files 68 and controls the corresponding equipment 30.

The resetting determination unit 66 determines whether the finger position detecting unit 36 has recognized part of the arm of the operator 18. If the finger position detecting unit 36 fails to recognize part of the arm, the resetting determination unit 66 enters a wait mode until the finger position detecting unit 36 recognizes part of the arm again. If the finger position detecting unit 36 recognizes part of the arm again, the resetting determination unit 66 allocates the operation area again. In this manner, the resetting determination unit 66 can provide the following advantage. That is, if, for example, the operator moves their finger to, for example, the left edge or the right edge of the touch panel during first recognition of the finger, a subsequent operation performed on the touch panel may be difficult. In such a case, by temporarily stopping recognition of the finger performed by the finger position detecting unit 36 and starting the resetting determination unit 66, the first recognition of the finger can be reset and the finger can be re-recognized so as to be at a position that allows a subsequent operation to be easily performed.

In the case where the touch panel 40 includes the display panel 41, the control unit 38 further includes an operation area display unit 72. The operation area display unit 72 displays an image indicating the plurality of allocated operation areas (a layout image) on the display panel 41 of the touch panel 40. An example of the layout image is an image obtained by partitioning a display area 41a of the display panel 41 into three operation areas corresponding to the three options A, B, and C, as illustrated in FIGS. 7A to 7C. For example, the three operation areas has characters "A", "B", "C" displayed therein with a background color. In addition, a line indicating a boundary (e.g., a dashed line) is displayed between the operation areas. Note that in the case of the touch panel 40 without the display panel 41, such a layout image is not displayed.

In addition, as illustrated in FIG. 2, the operation input device 10 further includes a feedback unit 74, and the control unit 38 further includes a feedback controller 76. The feedback unit 74 feeds back, to the operator 18, information indicating that the finger 18a of the operator 18 has moved from one of the operation areas to another operation area of the operation surface.

To feed back the information to the operator 18, a technique using vibration, a technique using light emission, or a technique using sound can be employed. Since the operator 18 may drive the vehicle 12, the technique using vibration is desirably employed. The feedback unit 74 that uses vibration can be formed from a vibration generating unit 78 disposed in the armrest 22. The feedback controller 76 of the control unit 38 controls the vibration generating unit 78 on the basis of the layout information regarding the operation areas corresponding to the options and the positional information regarding the finger 18a obtained from the finger position detecting unit 36.

Examples of the layout information include the above-described information contained in the operation area files 68 and the information contained in the boundary information files 70. The feedback controller 76 sequentially retrieves, for example, the positional information regarding the finger 18a obtained from the finger position detecting unit 36 and compares the positional information with the range of the boundary (positional information). If the positional information regarding the finger 18a indicates that the finger 18a crosses one of the boundaries, the feedback controller 76 outputs a drive signal to the vibration generating unit 78 to drive the vibration generating unit 78 for only a predetermined period of time (e.g., 0.5 seconds to 2 seconds).

A first processing operation performed by the operation input device 10 is described below with reference to flowcharts illustrated in FIGS. 8 and 9.

As illustrated in FIG. 8, in step S1, the option display unit 32 displays, on the display 16, options required to operate the equipment 30 selected by the operator 18 on the basis of an instruction sent from the control unit 38.

In step S2, the color coding display unit 62 displays the plurality of options on the display 16 in, for example, a blue color indicating the non-selected mode.

In step S3, the finger position detecting unit 36 recognizes part of the arm of the operator 18 (e.g., the finger 18a, the palm 18b, the wrist 18c, or the lower arm 18d). That is, as illustrated in FIG. 3, when the operator 18 places, for example, the lower arm 18d on the armrest 22 to operate the touch panel 40 and moves the finger 18a onto the operation surface of the touch panel 40, the finger position detecting unit 36 recognizes part of the arm of the operator 18.

In step S4, the operation area allocation unit 60 allocates a plurality of operation areas equal in number to the number of options. As described above, the operation areas are not physically allocated in the operation input unit 34, but the layout range (the positional information) of each of the operation areas is stored, in the form of data, in a corresponding one of the operation area files 68 in the storage unit of the control unit 38. In such a case, the range of a boundary between adjacent operation areas (the positional information) is also stored in a corresponding one of the boundary information files 70 in the form of data.

In step S5, among the allocated operation areas, the operation area allocation unit 60 relates the operation area corresponding to the positional information regarding the finger 18a obtained by the finger position detecting unit 36 to a particular one of the particular options. The identification number of the particular option is registered in the operation area file 68 for the operation area corresponding to the positional information regarding the finger 18a. As described above, the identification number of the option that is most frequently used is searched for on the basis of the information regarding the option and is registered. Alternatively, the identification number of the option located in the middle is searched for and is registered. Thereafter, the other operation areas are related to the options other than the particular option. That is, the identification numbers of the options other than the particular option are registered in the other operation area files 68.

In step S6, the operation area display unit 72 displays an image indicating the allocated operation areas (a layout image) on the display panel 41 of the operation input unit 34. This processing is performed on only the operation input unit 34 having the display panel 41 in the touch panel 40. As illustrated in FIGS. 7A to 7C, the layout image is an image of the display area 41a of the display panel 41 that is partitioned into three operation areas A, B, and C which correspond to three options A, B, and C, respectively. Furthermore, a line (e.g., a dashed line) indicating a boundary Ba between the operation areas A and B and a line indicating a boundary Bb between the operation areas B and C are displayed. Note that in the case of the touch panel 40 without a display panel, such a layout image cannot be displayed. Accordingly, the process in step S6 is not performed.

In step S7, the color coding display unit 62 displays a particular option among the options on the display 16 in, for example, a yellow color indicating the selected mode. In FIGS. 7A to 7C, among the three options A, B, and C, the operation area B located in the middle is being selected (the operation area B is indicated by hatchings).

In step S8, the resetting determination unit 66 determines whether allocation of the operation areas and resetting of the particular option are required. The determination is made by determining whether part of the arm of the operator 18 has been recognized by the finger position detecting unit 36, that is, by determining whether the positional information regarding the finger 18a of the operator 18 has been obtained by the finger position detecting unit 36. If the finger 18a of the operator 18 has not yet been obtained by the finger position detecting unit 36, it is determined that resetting is required. Thus, the processing returns to step S3, and the processing in step S3 and subsequent steps is repeated. However, if the finger position detecting unit 36 continuously recognizes part of the arm of the operator 18, the processing proceeds to step S9 and subsequent steps illustrated in FIG. 9.

In step S9, the feedback controller 76 determines whether the finger 18a of the operator 18 is moving. This determination is made by determining whether the positional information received from the finger position detecting unit 36 varies during a predetermined period of time (several μ seconds to several hundred μ seconds). If the positional information has varied by more than or equal to a predetermined distance (e.g., 1 to 2 mm), the processing proceeds to step S10, where it is determined whether the finger 18a of the operator 18 has crossed the boundary. The determination is made on the basis of the positional information received from the finger position detecting unit 36 and the data indicating the boundaries and registered in the boundary information files 70.

If the finger 18a of the operator 18 has crossed the boundary, the processing proceeds to step S11, where the feedback controller 76 drives the vibration generating unit 78 disposed in the armrest 22 for a predetermined period of time to generate vibration. In this manner, the operator 18 can be aware that the finger 18a has moved over one of the operation areas without moving their sight to the touch panel 40.

In step S12, among the plurality of options, the color coding display unit 62 displays the option corresponding to the operation area indicated by the positional information received from the finger position detecting unit 36 in, for example, a yellow color indicating the selected mode. In addition, the color coding display unit 62 displays the option previously set in the selected mode in a blue color indicating the non-selected mode.

That is, as illustrated in FIG. 10A, for example, when the finger 18a located above the operation area B in the middle is moved to the right and if the finger 18a crosses the boundary Bb on the right side, vibration is generated. Then, as illustrated in FIG. 10B, when the finger 18a is placed in the operation area C on the right side, the option C corresponding to the operation area C enters the selected mode (for example, the option C is displayed in the yellow color, as indicated by hatchings in FIG. 10B). At that time, the option B located in the middle enters the non-selected mode.

In addition, although not illustrated, when the finger 18a located on the operation area C on the right side is moved to the left and if the finger 18a crosses the boundary Bb, vibration is generated. Thereafter, when the finger 18a is placed in the operation area B in the middle, the option B corresponding to the operation area B enters the selected mode. Thereafter, if the finger 18a is further moved to the left and crosses the boundary Ba on the left side, vibration is generated. When the finger 18a is located in the operation area A on the left side, the corresponding option A enters the selected mode.

However, if, in step S9, it is determined that the position of the finger 18a of the operator 18 is negligibly changed, the processing proceeds to step S13, where the operation input unit 34 determines whether the finger 18a of the operator 18 is in contact with the operation surface. If the finger 18a of the operator 18 is in contact with the operation surface, the processing proceeds to the subsequent step S14. In step S14, among the plurality of options, the color coding display unit 62 displays the option corresponding to the operation area indicated by the positional information received from the operation input unit 34 in, for example, a red color indicating the execution mode. In addition, the color coding display unit 62 displays the option previously set in the selected mode in a blue color indicating the non-selected mode.

For example, as illustrated in FIG. 10C, when the finger 18a located above the operation area C on the right side is brought into contact with the operation surface of the touch panel 40, the option C corresponding to the operation area C enters an execution mode (for example, the option C is displayed in a red color, as indicated by hatchings in FIG. 10C). At that time, the other options enter the non-selected mode.

In step S15 illustrated in FIG. 9, among the plurality of the operation area files 68, the equipment control unit 64 reads out the control information from the operation area file 68 corresponding to the operation area with which the finger 18a of the operator 18 is in contact. That is, the equipment control unit 64 reads out the control information corresponding to the option set in the execution mode. Thereafter, the equipment control unit 64 controls the target equipment 30 on the basis of the readout control information.

When the process in step S15 is completed, when in step S13, it is determined that contact of the finger 18a is not detected, when the process in step S12 is completed, or when in step S10, it is determined that the finger 18a does not cross the boundary, the processing proceeds to step S16. In step S16, the control unit 38 determines whether a new equipment 30 has been selected. If a new equipment 30 has been selected, the processing returns to step S1 illustrated in FIG. 8, where the processes in step S1 and the subsequent steps are repeated.

However, if, in step S16 illustrated in FIG. 9, it is determined that a new equipment 30 has not been selected, the processing proceeds to the subsequent step S17, where it is determined whether a completion request (e.g., a power-off request or a maintenance request) has been input to the operation input device 10. If a completion request has not been input, the processing proceeds to step S8 illustrated in FIG. 8, where the processes in step S8 and the subsequent steps are repeated.

If the completion request has been detected in step S17 illustrated in FIG. 9, the first processing operation performed by the operation input device 10 is completed.

According to the first processing operation, if the distance between the arm of the operator 18 and the operation input unit 34 is less than or equal to a predetermined threshold value, that is, if part of the arm of the operator 18 is recognized by the finger position detecting unit 36, an operation area is set immediately below the finger 18a of the operator 18. In addition, the operation area is related to a particular option. In this manner, the operation area of the operation input unit 34 and the particular option are set in accordance with the operation performed by the operator 18 without the need for the operator 18 to adapt to the operation input unit 34 (the touch panel 40). Accordingly, the operator 18 can select one of the options without moving their sight to the touch panel 40. That is, the occurrence of a situation in which the operator 18 moves their eyes from the front window is reduced. Thus, the ease of operation performed by the operator 18 can be increased.

The operation input device 10 includes the armrest 22. The finger position detecting unit 36 is disposed in the armrest 22. The finger position detecting unit 36 includes the pressure sensor 48 that detects the pressure of the arm against the armrest 22 when the operator 18 places part of their arm on the armrest 22. In this manner, the operation input device 10 can easily obtain the positional information regarding the finger 18a of the operator 18 using a pressure distribution received from the pressure sensor 48. As a result, the operator 18 can intuitively and easily select one of the options using the touch panel 40 without moving their sight to the touch panel 40.

In addition, in the case of the armrest 22 having the trackball 50, the trackball 50 moves with movement of part of the arm of the operator 18. Accordingly, the positional information regarding the finger 18a of the operator 18 can be obtained on the basis of the rotation direction and the amount of rotation of the trackball 50. Even in such a case, the operator 18 can intuitively and easily select one of the options using the touch panel 40 without moving their sight to the touch panel 40.

In addition, according to the present exemplary embodiment, when part of the arm is recognized, a particular operation area is set immediately beneath the finger 18a and, in addition, the operation area is related to the particular option. In general, when the operator 18 operates the touch panel 40 during recognition of part of the arm, the operator 18 unintentionally places the finger 18a at substantially the same position. That is, the operator 18 habitually places the finger at the position, and the finger is frequently placed at the same position. A particular operation area is set at such a position and is related to the particular option. Accordingly, by setting the particular option to a frequently used option, the operator 18 can select one of the options without moving their sight to the touch panel 40.

In addition, when the finger 18a is moved to the operation area A on the left side or the operation area C on the right side in operating the touch panel 40, the finger 18a passes through the operation area B located between the operation areas A and C. Accordingly, it is reasonable and efficient in operating the touch panel 40 that the option that is most frequently used is assigned to the operation area B in the middle. Accordingly, by setting the option located in the middle to the particular option, the operator can efficiently operate the touch panel 40 without moving their sight to the touch panel 40. Thus, the operator can operate the touch panel 40 with little frustration.

Furthermore, the operation input device 10 includes the feedback unit 74 that feeds back, to the operator 18, the information indicating that the finger 18a of the operator 18 moves from one of the operation areas to another operation area. In this manner, upon receiving the feedback, the operator 18 can be easily aware that the finger 18a has moved to another operation area. Thus, when selecting one of the options, the operator 18 need not move their sight to the touch panel 40.

In particular, to feed back the information to the operator 18, a technique using vibration, a technique using light emission, or a technique using sound can be employed. In the case of the technique using sound, the sound may be masked by other sound (e.g., music or speech). In the case of the technique using light emission, the vision of the operator may be temporarily disturbed due to the light. However, in the case of the technique using vibration, such problems do not arise. The vibration is directly transferred to the operator. Thus, the ease of operation performed by the operator increases.

Furthermore, according to the present exemplary embodiment, by controlling the option display unit 32 that displays the options on the display 16, the option corresponding to the operation area at a position indicated by the positional information regarding the finger obtained by the finger position detecting unit 36 among the plurality of options is displayed in a predetermined color indicating the selected mode. In addition, the option corresponding to the operation area with which the finger 18a of the operator 18 is in contact is displayed in another color indicating the execution mode. Furthermore, the other options are displayed in another color indicating the non-selected mode. In this manner, by looking at and checking the colors of the options displayed on the display 16, the operator can be easily aware which option is selected and executed without moving their sight to the touch panel 40.

A second processing operation performed by the operation input device 10 is described below with reference to flowcharts illustrated in FIGS. 11 and 12.

The second processing operation is substantially the same as the above-described first processing operation. However, unlike the first processing operation that is performed on only one operation area of the touch panel 40 for one option, the second processing operation is performed on a plurality of options at the same time. That is, two or more options including the option located in the middle are operated at the same time.

Accordingly, among steps S101 to S117 illustrated in FIGS. 11 and 12, steps S105, S107, S112, S114, and S115, which differ from steps of the first processing operation, are mainly described.

In step S105 illustrated in FIG. 11, among a plurality of allocated operation areas, the operation area allocation unit 60 relates the operation area corresponding to the positional information regarding the finger obtained by the finger position detecting unit 36 to a plurality of particular options. At that time, the operation area allocation unit 60 registers the identification numbers of the plurality of particular options in one of the operation area files 68 for the operation area corresponding to the positional information regarding the finger. For example, the operation area allocation unit 60 relates the operation area having the finger 18a located therein (e.g., the operation area B) to a plurality of options (e.g., three options A, B, and C).

In step S107, the color coding display unit 62 displays the plurality of particular options on the display 16 in, for example, a yellow color indicating the selected mode. For example, as illustrated in FIG. 13A, when the finger 18a is placed above the operation area B in the middle, the three options A, B, and C are simultaneously selected and, thus, the three options are displayed in a yellow color (as indicated by hatchings).

Thereafter, if the finger 18a moves and crosses a boundary, vibration is generated for a predetermined period of time (refer to steps S110 and S111 illustrated in FIG. 12). Subsequently, in step S112, the color coding display unit 62 displays the plurality of options corresponding to the operation area indicated by the positional information regarding the finger 18a in, for example, a yellow color indicating the selected mode. In addition, the color coding display unit 62 displays the other options in a blue color indicating the non-selected mode.

For example, as illustrated in FIG. 13B, when the finger 18a is moved to, for example, the right and crosses the boundary Bb, vibration is generated. If the finger 18a passes through the boundary Bb and is placed above the operation area C on the right side, two options B and C from the right among the three options enter the selected mode.

Similarly, although not illustrated, if the finger 18a located above the operation area C on the right side is moved to the left and crosses the boundary Bb, vibration is generated. When the finger 18a is placed above the operation area B in the middle, the corresponding options A, B, and C enter the selected mode. Thereafter, the finger 18a is further moved to the left and crosses the boundary Ba, vibration is generated. When the finger 18a is placed above the operation area A on the left side, the corresponding options A and B enter the selected mode.

Subsequently, in step S114 illustrated in FIG. 12, if the finger 18a is brought into contact with the operation surface, the color coding display unit 62 displays, among the plurality of options, a plurality of options corresponding to the operation area indicated by the positional information received from the operation input unit 34 in, for example, a red color indicating the execution mode.

For example, as illustrated in FIG. 13C, if the finger 18a located above the operation area C on the right side is brought into contact with the operation surface of the touch panel 40, the corresponding options B and C enter the execution mode (the options B and C are displayed in, for example, a red color as indicated by vertical hatchings in FIG. 13C). In addition, the other options enter the non-selected mode.

Similarly, although not illustrated, if the finger 18a is brought into contact with, for example, the operation area B in the middle, three options A, B, and C are simultaneously executed. If the finger 18a is brought into contact with the operation area A on the left side, two options A and B are simultaneously executed.

Some equipment 30 performs a particular function if a plurality of options are simultaneously operated. In such a case, in general, "multi-touch" in which two or more fingers touch different operation areas at the same time is required. To perform multi-touch, the operator needs to move their sight to the operation surface of the touch panel 40 and perform an operation. In addition, since it is difficult for the operator to intuitively recognize which finger is to be used to operate the touch panel 40, a certain period of time may be required until a particular function is performed. However, according to the second processing operation performed by the operation input device 10 according to the present exemplary embodiment, a plurality of options can be selected by only the finger 18a and be executed at the same time. Accordingly, multi-touch is not needed. In addition, since the touch panel 40 can be operated by only one finger 18a (e.g., an index finger), the operator can easily execute a particular function without moving their sight to the touch panel 40. Thus, the ease of operation performed by the operator can be increased.

A third processing operation performed by the operation input device 10 is described below with reference to flowcharts illustrated in FIGS. 14 and 15.

The third processing operation is substantially the same as the above-described first processing operation. However, unlike the first processing operation, the third processing operation includes a different process performed by the operation area display unit 72. In addition, a process in step S213 is additionally provided (refer to FIG. 15).

That is, in the first processing operation, a plurality of operation areas corresponding to a plurality of options are displayed on the display panel 41. In contrast, in the third processing operation, only the operation area corresponding to an option set in the selected mode is displayed on the display panel 41. Note that the process performed by the operation area allocation unit 60, that is, the process for allocating a plurality of operation areas equal in number to the number of the options is the same as that in the first processing operation. As illustrated in FIGS. 7A to 7C, the operation areas are allocated (logically allocated) so that a plurality of operation areas (the operation areas A, B, and C) are laid out in the display panel 41 in correspondence with a plurality of options (the options A, B, and C).

Figure 14:
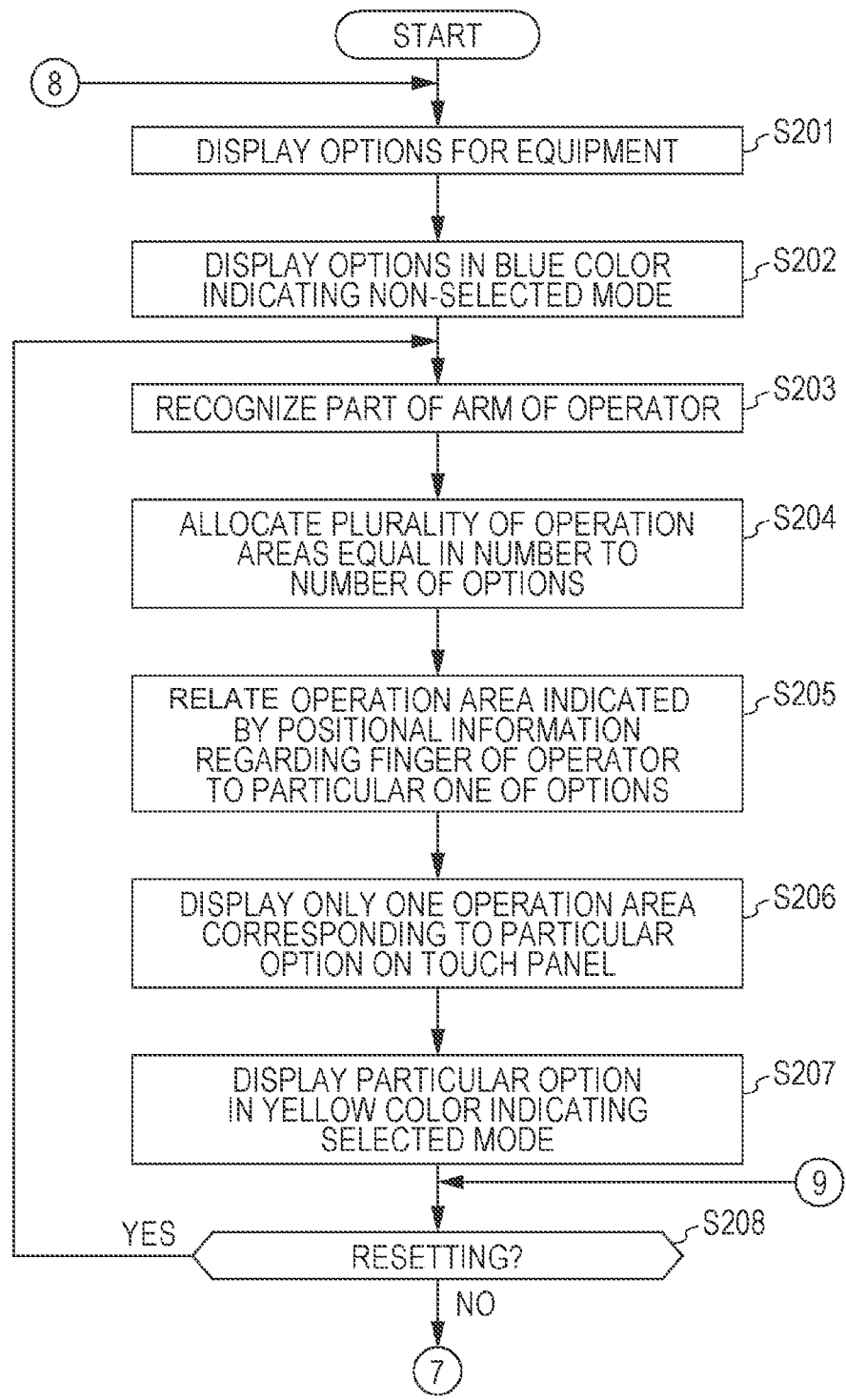
FIG. 14 is a first flowchart illustrating a third processing operation performed by the vehicle operation input device according to the exemplary embodiment.

Thereafter, in step S206 illustrated in FIG. 14, among the plurality of operation areas, the operation area display unit 72 displays only one operation area corresponding to the particular option on the display panel 41 of the touch panel 40. For example, as illustrated in FIG. 16A, after a part of the arm of the operator 18 (e.g., the finger 18a, the palm 18b, the wrist 18c, or the lower arm 18d) is recognized, an image indicating the operation area (e.g., the operation area B) corresponding to the particular option (i.e., the option B) is displayed, as illustrated in FIG. 16B. The entire operation surface tentatively serves as the operation area corresponding to the particular option. In contrast, as illustrated in FIG. 7A, the operation areas A, B, and C, the boundary Ba, and the boundary Bb are logically set in the operation area file 68 and the boundary information file 70.

Figure 15:
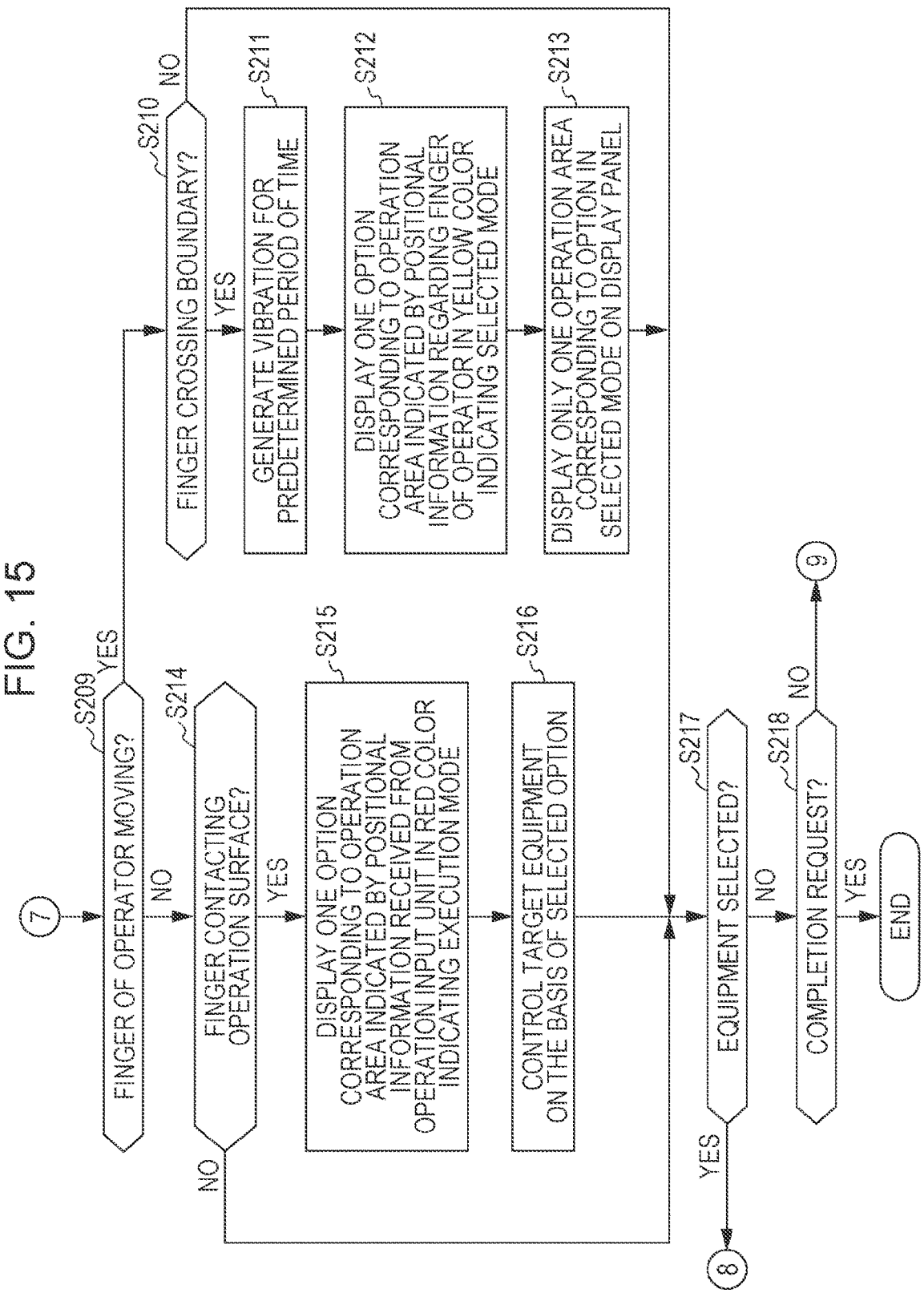
FIG. 15 is a second flowchart illustrating the third processing operation performed by the vehicle operation input device according to the exemplary embodiment.

If the finger 18a is moved and crosses a boundary, vibration is generated for a predetermined period of time (steps S210 and S211 illustrated in FIG. 15). Thereafter, in step S212, the color coding display unit 62 displays the option corresponding to the operation area indicated by the positional information regarding the finger 18a in, for example, a yellow color indicating the selected mode. In addition, the color coding display unit 62 displays the other options in a blue color indicating the non-selected mode.

Figure 17A:
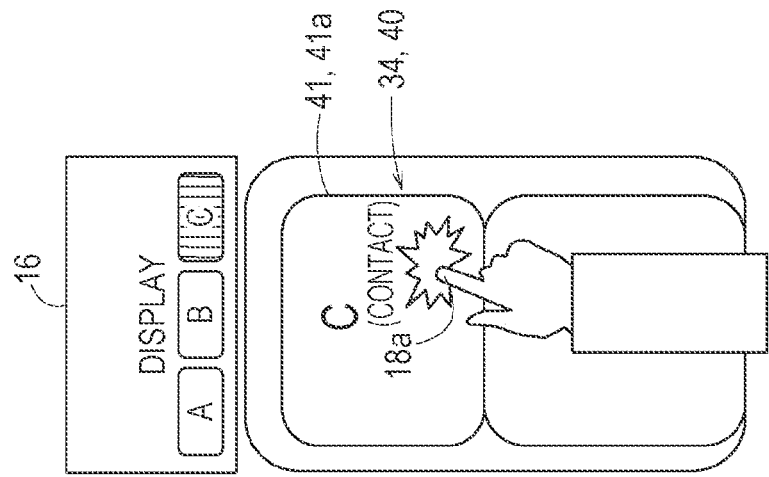
FIG. 17A illustrates the case where in the third processing operation, the finger placed in the substantially middle of the operation surface in the lateral direction to select the option in the middle is moved to the operation area on the right side.
Figure 17B:
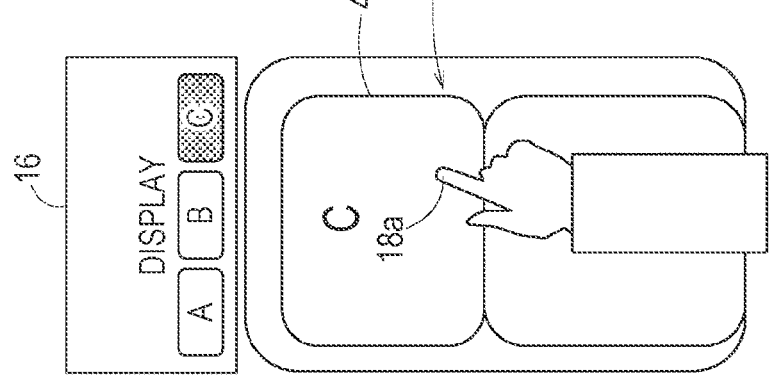
FIG. 17B illustrates the case where the finger moved to the operation area on the right side is selecting the option on the right side at the same time.

Subsequently, in step S213, among the plurality of operation areas, the operation area display unit 72 displays only one operation area corresponding to the option set in the selected mode on the display panel 41 of the touch panel 40. For example, as illustrated in FIG. 17A, if the finger 18*a* is moved to the right and crosses a boundary (not illustrated on the display panel 41), vibration is generated. If, thereafter, the finger 18*a* crosses the boundary and reaches a position above the operation area C on the right side, the option C on the right side among the three options enters the selected mode. At the same time, as illustrated in FIG. 7B, the image of the operation area C corresponding to the option C is displayed on the display panel 41.

Similarly, although not illustrated, if the finger 18*a* located above the operation area C on the right side is moved to the left and crosses a boundary, vibration is generated. When the finger 18*a* is placed above the operation area B in the middle, the option B enters the selected mode and, thus, the image of the operation area B is displayed on the display panel 41. If the finger 18*a* is further moved to the left and crosses the boundary on the left side, vibration is generated. When the finger 18*a* is placed above the operation area A on the left side, the option A enters the selected mode and, thus, the image of the operation area A is displayed on the display panel 41.

Subsequently, if the finger 18*a* is brought into contact with the operation surface, the color coding display unit 62 displays, among the plurality of options, an option corresponding to the operation area indicated by the positional information received from the operation input unit 34 in, for example, a red color indicating the execution mode in step S215.

Figure 17C:
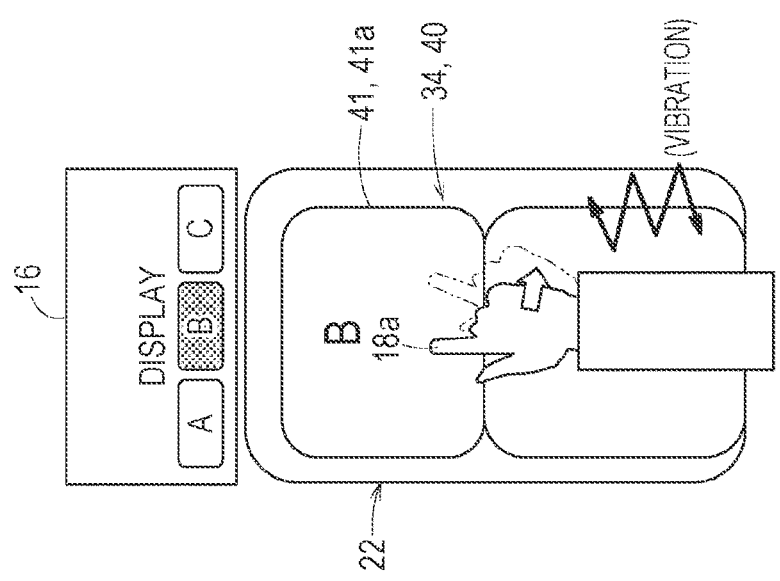
FIG. 17C illustrates the case where the finger touches the operation area on the right side to execute the option on the right side.

For example, as illustrated in FIG. 17C, if the finger 18*a* located above the operation area C on the right side is brought into contact with the operation surface of the touch panel 40, the corresponding option C enters the execution mode (the option C is displayed in, for example, a red color as indicated by vertical hatchings in FIG. 17C). In addition, the other options enter the non-selected mode.

As described above, in the third processing operation, only the image of the operation area corresponding to the selected option is displayed on the display panel 41 of the touch panel 40. Accordingly, by simply looking at the touch panel 40, the operator can be easily and rapidly aware which option is being selected.

SUMMARY OF EXEMPLARY EMBODIMENT

As described above, according to the above-described exemplary embodiment, the operation input device 10 capable of operating the equipment 30 includes the option display unit 32 that displays, on the display 16, a plurality of options to be selected by the operator 18, where the options relate to the types of processing performed by the equipment 30, the operation input unit 34 (the touch panel 40) that has the operation surface and generates the operating information indicating a position in the operation surface at which the finger 18*a* of the operator 18 touches the operation surface, the finger position detecting unit 36 that detects the position of the part of the arm of the operator 18 and obtains the position as the positional information regarding the finger 18*a* of the operator 18, and the control unit 38 that controls at least the option display unit 32 and the equipment 30 in accordance with the operating information generated by the operation input unit 34.

Among the plurality of options, the control unit 38 sets a particular option immediately beneath the finger 18*a* in accordance with the positional information regarding the finger 18*a* obtained by the finger position detecting unit 36.

The control unit 38 may relate the positional information regarding the finger 18*a* obtained by the finger position detecting unit 36 to at least one of the options located in the middle among the plurality of options.

The control unit 38 may relate the positional information regarding the finger 18*a* obtained by the finger position detecting unit 36 to one of the options that is most frequently used by the operator 18 among the plurality of options.

The control unit 38 may relate the positional information regarding the finger 18*a* obtained by the finger position detecting unit 36 to two or more options including the option located in the middle among the plurality of options.

According to the present exemplary embodiment, the operation input device 10 may further include the armrest 22 that allows the operator 18 to put the arm 20 of the operator 18 thereon. The finger position detecting unit 36 may include the pressure sensor 48 disposed on the armrest 22, and the finger position detecting unit 36 may detect the pressure of the arm 20 against the armrest 22 when the operator 18 puts their arm 20 on the armrest 22. The finger position detecting unit 36 may obtain the positional information regarding the finger 18*a* using the pressure distribution 54 of the arm 20 detected by the pressure sensor 48.

According to the present exemplary embodiment, the operation input device 10 may further include the armrest 22 that allows the operator 18 to put the arm 20 of the operator 18 thereon. The finger position detecting unit 36 may include the trackball 50 disposed on the armrest 22, and the finger position detecting unit 36 may detect the movement of the arm 20 when the operator 18 puts their arm 20 on the armrest 22. The finger position detecting unit 36 may obtain the positional information regarding the finger 18*a* using the rotation direction and the amount of rotation of the trackball 50.

According to the present exemplary embodiment, the operation input device 10 may further include the feedback unit 74 that feeds back, to the operator 18, the information indicating that the finger 18*a* of the operator 18 has moved from the current operation area to another operation area. The control unit 38 may control the feedback unit 74 on the basis of the layout information regarding the plurality of operation areas corresponding to the plurality of options and the positional information regarding the finger 18*a* received from the finger position detecting unit 36.

In such a case, the feedback unit 74 may include the vibration generating unit 78 that feeds back the information to the operator 18 using vibration. The control unit 38 may control the vibration generating unit 78 to generate the vibration when the finger 18*a* of the operator 18 is moved from the current operation area to another operation area of the operation surface.

According to the present exemplary embodiment, the control unit 38 may control the option display unit 32 to display, among the plurality of options, an option corresponding to the operation area located at a position indicated by the positional information regarding the finger 18*a* obtained by the finger position detecting unit 36 in a color indicating a selected mode, display an option corresponding to the operation area that the finger 18*a* of the operator 18 touches in another color indicating an execution mode, and display the other options in another color indicating a non-selected mode.

It is desirable that the number of options is 2 to 5. This is because such a number allows the operator to intuitively recognize the number without determining on which operation area the finger is currently located.

It should be noted that in addition to the configuration of the above-described embodiment, the present disclosure can provide a variety of configurations based on the descriptions above. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle operation input device capable of operating equipment, comprising:
    an option display unit that displays, on a display, a plurality of options to be selected by an operator, the options relating to types of processing performed by the equipment;
    an operation input unit having an operation surface, the operation input unit generating operating information indicating a position in the operation surface at which a finger of the operator touches the operation surface;
    a finger position detecting unit that detects a position of part of an arm of the operator and obtains the position as the positional information regarding the finger of the operator; and
    a control unit that controls at least the option display unit and the equipment in accordance with the operating information generated by the operation input unit,
    wherein the control unit allocates a particular option among the plurality of options to a portion of the operation surface immediately beneath the finger in accordance with the positional information regarding the finger obtained by the finger position detecting unit.

2. The vehicle operation input device according to claim 1, wherein the control unit associates the positional information regarding the finger obtained by the finger position detecting unit with at least one of the options located in the middle among the plurality of options.

3. The vehicle operation input device according to claim 1, wherein the control unit associates the positional information regarding the finger obtained by the finger position detecting unit with one of the options that is most frequently used by the operator among the plurality of options.

4. The vehicle operation input device according to claim 1, wherein the control unit associates the positional information regarding the finger obtained by the finger position detecting unit with two or more options including the option located in the middle among the plurality of options.

5. The vehicle operation input device according to claim 1, further comprising:
    an armrest that allows the operator to put the arm of the operator thereon,
    wherein the finger position detecting unit includes a pressure detecting unit disposed on the armrest, the pressure detecting unit detecting a pressure of the arm against the armrest when the operator puts the arm on the armrest, and
    wherein the finger position detecting unit obtains the positional information regarding the finger using a pressure distribution of the arm detected by the pressure detecting unit.

6. The vehicle operation input device according to claim 1, further comprising:
    an armrest that allows the operator to put an arm of the operator thereon,
    wherein the finger position detecting unit includes a trackball disposed on the armrest, the trackball detecting movement of the arm when the operator puts the arm on the armrest, and
    wherein the finger position detecting unit obtains the positional information regarding the finger using a rotation direction and an amount of rotation of the trackball.

7. The vehicle operation input device according to claim 1, further comprising:
    a feedback unit that feeds back, to the operator, information indicating that the finger of the operator has moved from a current operation area to another operation area,
    wherein the control unit controls the feedback unit using layout information regarding the plurality of operation areas corresponding to the plurality of options and the positional information regarding the finger received from the finger position detecting unit.

8. The vehicle operation input device according to claim 7, wherein the feedback unit includes a vibration feedback unit that feeds back the information to the operator using vibration, and
    wherein the control unit controls the vibration feedback unit to generate the vibration when the finger of the operator is moved from the current operation area to another operation area of the operation surface.

9. The vehicle operation input device according to claim 1, wherein the control unit controls the option display unit to display, among the plurality of options, an option corresponding to the operation area located at a position indicated by the positional information regarding the finger obtained by the finger position detecting unit in a color indicating a selected mode, display an option corresponding to the operation area that the finger of the operator touches in another color indicating an execution mode, and display the other options in another color indicating a non-selected mode.

10. The vehicle operation input device according to claim 1, wherein the control unit sets the particular option to the operation surface at a position immediately beneath the finger such that the operator is able to select the particular option by touching the operation surface.

11. The vehicle operation input device according to claim 1, wherein the control unit defines a plurality of operation areas on the operation surface and associates the particular option with at least one of the operation areas located at a position immediately beneath the finger such that the operator is able to select the particular option by touching the at least one of the operation areas.

12. The vehicle operation input device according to claim 11, wherein the control unit logically allocates the plurality of operation areas on the operation surface.

13. The vehicle operation input device according to claim 11, wherein the plurality of operation areas correspond to the plurality of options, respectively.

14. The vehicle operation input device according to claim 13, wherein an arrangement of the plurality of operation areas correspond to an arrangement of the plurality of options on the display.

15. The vehicle operation input device according to claim 1, wherein the part of the arm of the operator includes at least one of a finger, a palm, a wrist and a lower arm.

16. The vehicle operation input device according to claim 1, wherein the equipment is an air conditioner, a power window unit, a navigation device or a display audio device.

17. The vehicle operation input device according to claim 1, wherein the finger position detecting unit obtains coordinates of the position of the finger of the operator.

18. The vehicle operation input device according to claim 1, wherein the control unit changes a position of the particular option on the operation surface depending on a position of the finger such that the particular option on the operation surface is located immediately beneath the finger.

19. A vehicle comprising the vehicle operation input device according to claim 1.

20. A vehicle operation input device capable of operating equipment, comprising:

an option display device that displays, on a display, a plurality of options to be selected by an operator, the options relating to types of processing performed by the equipment and being displayed side by side;

an operation input device having an operation surface, the operation input device generating operating information indicating a position in the operation surface at which a finger of the operator touches the operation surface;

a finger position detector that detects a position of part of an arm of the operator and obtains the position of a finger of the operator using the position of the part of the arm; and a controller that controls at least the option display unit and the equipment in accordance with the operating information generated by the operation input device, wherein the controller defines a plurality of operation areas on the operation surface corresponding to the plurality of options respectively and allocates a particular option among the plurality of options to a portion of the operation areas located at a position immediately beneath the finger in accordance with the position of the finger.

* * * * *